United States Patent
Ito et al.

(10) Patent No.: US 9,577,290 B2
(45) Date of Patent: *Feb. 21, 2017

(54) NONAQUEOUS SOLVENT, NONAQUEOUS ELECTROLYTE, AND POWER STORAGE DEVICE

(71) Applicant: SEMICONDUCTOR ENERGY LABORATORY CO., LTD., Atsugi-shi, Kanagawa-ken (JP)

(72) Inventors: Kyosuke Ito, Saitama (JP); Toru Itakura, Kanagawa (JP); Nobuhiro Inoue, Kanagawa (JP); Jun Ishikawa, Kanagawa (JP); Junpei Momo, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,562

(22) Filed: Dec. 19, 2012

(65) Prior Publication Data

US 2013/0164609 A1 Jun. 27, 2013

(30) Foreign Application Priority Data

Dec. 23, 2011 (JP) ................. 2011-282485

(51) Int. Cl.
*H01M 10/0566* (2010.01)
*H01M 10/0569* (2010.01)
*H01M 10/052* (2010.01)

(52) U.S. Cl.
CPC ..... *H01M 10/0569* (2013.01); *H01M 10/052* (2013.01); *H01M 2300/0045* (2013.01); *Y02E 60/122* (2013.01); *Y02T 10/7011* (2013.01)

(58) Field of Classification Search
CPC ......... H01M 10/0566; H01M 10/0569; H01M 10/0567
(Continued)

(56) References Cited

U.S. PATENT DOCUMENTS 4,710,310 A * 12/1987 Shinozaki et al. ........... 252/62.2
7,297,289 B2 11/2007 Sato et al.
(Continued)

FOREIGN PATENT DOCUMENTS

CN 101784524 A 7/2010
CN 101821892 A 9/2010
(Continued)

OTHER PUBLICATIONS

Chinese Office Action (Application No. 2012105639582) Dated Mar. 2, 2016.
(Continued)

*Primary Examiner* — Stewart Fraser
*Assistant Examiner* — Olantunji Godo
(74) *Attorney, Agent, or Firm* — Nixon Peabody LLP; Jeffrey L. Costellia

(57) ABSTRACT

A power storage device using an organic solvent as a nonaqueous solvent for a nonaqueous electrolyte, in which a CV charging period in CCCV charging can be prevented from being extended and which has high performance, can be provided. The power storage device includes a positive electrode, a negative electrode, and a nonaqueous electrolyte. The nonaqueous electrolyte includes an ionic liquid including an alicyclic quaternary ammonium cation having one or more substituents and a counter anion to the alicyclic quaternary ammonium cation, a cyclic ester, and an alkali metal salt. In particular, in the power storage device, the ionic liquid content is greater than or equal to 70 wt % and less than 100 wt % per unit weight of the ionic liquid and the
(Continued)

cyclic ester in the nonaqueous electrolyte, or greater than or equal to 50 wt % and less than 80 wt % per unit weight of the nonaqueous electrolyte.

24 Claims, 12 Drawing Sheets

(58) Field of Classification Search
USPC .......................................................... 429/200
See application file for complete search history.

(56) References Cited

U.S. PATENT DOCUMENTS

| | | | |
|---|---|---|---|
| 8,088,917 | B2 | 1/2012 | Forsyth et al. |
| 8,686,134 | B2 | 4/2014 | Forsyth et al. |
| 8,795,544 | B2 * | 8/2014 | Ito et al. ...................... 252/62.2 |
| 2005/0051438 | A1 * | 3/2005 | Pitner et al. .................. 205/413 |
| 2007/0042271 | A1 * | 2/2007 | Nishida et al. ............... 429/306 |
| 2007/0099079 | A1 | 5/2007 | Matsumoto et al. |
| 2007/0099090 | A1 | 5/2007 | Oh et al. |
| 2008/0296531 | A1 * | 12/2008 | Whiston et al. ........... 252/182.3 |
| 2010/0178555 | A1 | 7/2010 | Best |
| 2011/0070486 | A1 | 3/2011 | Matsumoto et al. |
| 2011/0080689 | A1 * | 4/2011 | Bielawski et al. ............ 361/502 |
| 2012/0002349 | A1 | 1/2012 | Ito et al. |
| 2012/0021279 | A1 | 1/2012 | Le Bideau et al. |
| 2012/0308882 | A1 | 12/2012 | Ito et al. |
| 2012/0328960 | A1 | 12/2012 | Ito et al. |
| 2013/0164610 | A1 | 6/2013 | Itakura et al. |

FOREIGN PATENT DOCUMENTS

| | | |
|---|---|---|
| JP | 2003-331918 | 11/2003 |
| JP | 2007-157536 A | 6/2007 |
| WO | WO-2008/150842 | 12/2008 |
| WO | WO-2009/003224 | 1/2009 |

OTHER PUBLICATIONS

Sakaebe et al., "N-Methyl-N-propylpiperidinium bis(trifluoromethanesulfonyl)imide (PP13-TFSI)—novel electrolyte base for Li battery", Electrochemistry Communications, Jul. 1, 2003, vol. 5, No. 7, pp. 594-598.

Matsumoto et al., "Fast cycling of Li/LiCoO$_2$ cell with low-viscosity ionic liquids based on bis(fluorosulfonyl)imide [FSI]", Journal of Power Sources, Elsevier Science Direct, Mar. 22, 2006, vol. 160, No. 2, pp. 1308-1313.

MacFarlane et al., "Pyrrolidinium Imides: A New Family of Molten Salts and Conductive Plastic Crystal Phases", Journal of Physical Chemistry B, Feb. 2, 1999, vol. 103, No. 20, pp. 4164-4170.

* cited by examiner 218  217

218  217

NONAQUEOUS SOLVENT, NONAQUEOUS ELECTROLYTE, AND POWER STORAGE DEVICE

BACKGROUND OF THE INVENTION

1. Field of the Invention

The present invention relates to a power storage device including an ionic liquid (also referred to as "room temperature molten salt").

Note that the power storage device refers to all elements and devices which have a function of storing power.

2. Description of the Related Art

A lithium secondary battery which is one of the power storage devices is used in a variety of applications including mobile phones and electric vehicles (EV). Characteristics such as high energy density, excellent cycle characteristics and safety under a variety of operating environments are necessary for the lithium secondary battery.

Many of the widely used lithium secondary batteries include a nonaqueous electrolyte (also referred to as "nonaqueous electrolyte solution") including a nonaqueous solvent and a lithium salt containing lithium ions. An organic solvent which is often used for the nonaqueous electrolyte is an organic solvent which is liquid at ordinary temperatures and pressures, such as ethylene carbonate which has high dielectric constant and excellent ion conductivity.

However, the organic solvent has volatility and a low flash point. For this reason, in the case where a nonaqueous solvent including the organic solvent is used for an electrolyte solution of a lithium secondary battery, the internal temperature of the lithium secondary battery might rise because of an internal short circuit, overcharge, or the like, and the lithium secondary battery might explode or ignite.

In view of the above, the use of an ionic liquid which has non-flammability and non-volatility as a solvent for a nonaqueous electrolyte of a lithium secondary battery has been proposed (see Parent Document 1).

REFERENCE

[Patent Document 1] Japanese Published Patent Application No. 2003-331918

SUMMARY OF THE INVENTION

Constant-current constant-voltage (CCCV) charging is employed for a power storage device in which lithium ions are used as carrier ions, such as a lithium secondary battery or a lithium ion capacitor. In the CCCV charging, the amount of charging current flowing through the power storage device decreases during a constant-voltage (CV) charging period. Thus, in many cases, the charging is terminated (i.e., the power storage device is fully charged) when a value of the charging current becomes lower than a desired current value.

However, in the case where a power storage device in which ethylene carbonate is used as a solvent for a nonaqueous electrolyte is charged by the CCCV charging, it takes time for charging current which flows during a constant-voltage (CV) charging period to be lower than a desired current value in some cases. This is probably attributed to a reaction other than a charging reaction, such as a decomposition reaction of the nonaqueous electrolyte. Note that the expression a "constant-voltage (CV) charging period is long" is used in this specification in order to mean that the time taken for charging current which flows during the CV charging period to be lower than a desired current value is long.

If a CV charging period is long, a reaction other than a charging reaction occurs accordingly as described above; thus, the internal temperature of the power storage device rises because of reaction heat, which results in risks such as ignition of the nonaqueous electrolyte and explosion of the power storage device.

In view of the above, in many cases, when a power storage device in which ethylene carbonate is used as a solvent for a nonaqueous electrolyte is charged by CCCV charging, the charging is terminated (i.e., the power storage device is fully charged) when CV charging is performed for a certain period. In that case, a circuit which functions as a timer for terminating the charging when the CV charging is performed for a certain period is provided for a charging device in the power storage device. In the case where the circuit which functions as the timer does not function normally because of malfunctions or the like, the CV charging period becomes long, which results in risks such as ignition of the nonaqueous electrolyte and explosion of the power storage device. This means that fully charging the power storage device when charging current becomes lower than a desired current value is more desirable, in terms of safety, than making the power storage device fully charged by forcibly terminating the CV charging when a predetermined period of time has passed.

In view of the above, an object of one embodiment of the present invention is to provide a power storage device in which a nonaqueous electrolyte including an organic solvent is used and a CV charging period in CCCV charging can be prevented from being extended.

Another object of one embodiment of the present invention is to provide a high-performance power storage device in which a nonaqueous electrolyte including an organic solvent is used.

In view of the above, one embodiment of the present invention is a power storage device which includes a positive electrode, a negative electrode, and a nonaqueous electrolyte. The nonaqueous electrolyte includes an ionic liquid including an alicyclic quaternary ammonium cation having one or more substituents and a counter anion to the alicyclic quaternary ammonium cation, a cyclic ester, and an alkali metal salt.

The number of carbon atoms of an alicyclic skeleton of the alicyclic quaternary ammonium cation in the ionic liquid is less than or equal to 5. Further, a substituent is bonded to a carbon atom of the alicyclic skeleton of the alicyclic quaternary ammonium cation in the ionic liquid.

Specifically, one embodiment of the present invention is a power storage device which includes a positive electrode, a negative electrode, and a nonaqueous electrolyte. The nonaqueous electrolyte includes an ionic liquid represented by General Formula (G1), a cyclic ester, and an alkali metal salt.

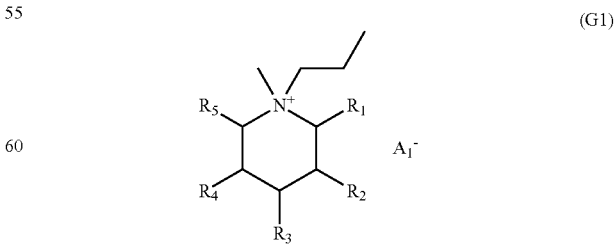

(G1)

In the formula, $R_1$ to $R_5$ each represent a hydrogen atom or an alkyl group having 1 to 20 carbon atoms; $A_1^-$ represents any of a monovalent imide-based anion, a monovalent methide-based anion, a perfluoroalkyl sulfonic acid anion, tetrafluoroborate, and hexafluorophosphate.

The ionic liquid content in the nonaqueous electrolyte is preferably greater than or equal to 70 wt % and less than 100 wt % per unit weight of the ionic liquid and the cyclic ester in the nonaqueous electrolyte, or greater than or equal to 50 wt % and less than 80 wt % per unit weight of the nonaqueous electrolyte.

The cyclic ester can be ethylene carbonate. The alkali metal salt included in the nonaqueous electrolyte can be a lithium salt.

An aprotic organic solvent can be used instead of the cyclic ester. Examples of the aprotic organic solvent are an acyclic ester, a cyclic ether, and an acyclic ether. The organic solvent included in the nonaqueous electrolyte may be a fluorinated cyclic ester, a fluorinated acyclic ester, a fluorinated cyclic ether, or a fluorinated acyclic ether. Note that the fluorinated cyclic ester in this specification refers to a cyclic ester in which fluorine is substituted for hydrogen as in a cyclic ester having alkyl fluoride. Therefore, also in the fluorinated acyclic ester, the fluorinated cyclic ether, and the fluorinated acyclic ether, fluorine is substituted for hydrogen.

According to one embodiment of the present invention, a CV charging period in CCCV charging can be prevented from being extended in a power storage device in which an organic solvent is used as a solvent for a nonaqueous electrolyte; thus, ignition of the nonaqueous electrolyte, explosion of the power storage device, or the like can be prevented, so that a power storage device with a high level of safety can be provided.

According to one embodiment of the present invention, a high-performance power storage device can be provided.

Specifically, according to one embodiment of the present invention, a reaction other than a charging reaction, such as a decomposition reaction of a nonaqueous electrolyte, can be suppressed in a power storage device in which an organic solvent is used as a solvent for the nonaqueous electrolyte; thus, a power storage device which has good cycle characteristics and high reliability can be provided. Moreover, according to one embodiment of the present invention, a power storage device which has a high level of safety, high reliability, and good charging and discharging rate characteristics can be provided.

DETAILED DESCRIPTION OF THE INVENTION

Figure 1A:
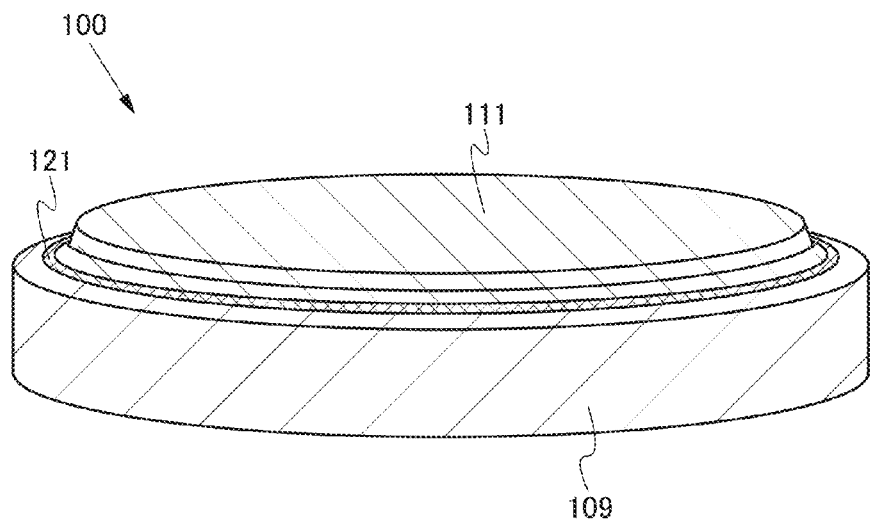
FIGS. 1A and 1B are a perspective view and a cross-sectional view illustrating a structure of a secondary battery of one embodiment of the present invention.

Hereinafter, embodiments and examples of the present invention will be described in detail with reference to the accompanying drawings. However, the present invention is not limited to the following description and it is easily understood by those skilled in the art that the mode and details can be variously modified without departing from the scope and spirit of the present invention. Therefore, the present invention should not be construed as being limited to the following description of the embodiments and examples. In describing structures of the present invention with reference to the drawings, the same reference numerals are used in common for the same portions in different drawings. The same hatching pattern is applied to similar parts, and the similar parts are not especially denoted by reference numerals in some cases. In addition, an insulating layer is not illustrated in a top view in some cases. Note that the size, the layer thickness, or the region of each structure illustrated in each drawing is exaggerated for clarity in some cases. Therefore, the present invention is not necessarily limited to such scales illustrated in the drawings.

(Embodiment 1)

In this embodiment, a nonaqueous electrolyte of one embodiment of the present invention which is used in a power storage device of one embodiment of the present invention will be described.

The nonaqueous electrolyte of one embodiment of the present invention, which is used in a power storage device, includes a nonaqueous solvent which is a mixed solvent of an organic solvent and an ionic liquid and a salt containing carrier ions of the power storage device. The salt is mixed with the solvent at a desired concentration, whereby the nonaqueous electrolyte can be manufactured.

Any salt can be used as the salt containing carrier ions of the power storage device as long as it contains alkali metal ions, alkaline earth metal ions, beryllium ions, or magnesium ions. Examples of the alkali metal ion include a lithium ion, a sodium ion, and potassium ion. Examples of the alkaline earth metal ion include a calcium ion, a strontium ion, and a barium ion. Note that in this embodiment, a lithium salt containing lithium ions is used as the salt. Examples of the lithium salt include lithium chloride (LiCl), lithium fluoride (LiF), lithium perchlorate (LiClO$_4$), lithium tetrafluoroborate (LiBF$_4$), LiAsF$_6$, LiPF$_6$, and Li(CF$_3$SO$_2$)$_2$N.

The organic solvent included in the mixed solvent may have a polarity and is preferably an aprotic solvent. For example, a cyclic ester such as ethylene carbonate having high dielectric constant and excellent ion conductivity, an acyclic ester, a cyclic ether, or an acyclic ether can be used. Alternatively, a fluorinated cyclic ester, a fluorinated acyclic ester, a fluorinated cyclic ether, or a fluorinated acyclic ether can be used.

At least one of the organic solvents given above may be included in the mixed solvent. Note that in the following description, the organic solvent which is included in the mixed solvent is ethylene carbonate.

In the case where a power storage device is manufactured using a single solvent, i.e., ethylene carbonate as the solvent for the nonaqueous electrolyte, a CV charging period becomes long, leading to risks such as ignition of the nonaqueous electrolyte and explosion of the power storage device as described above.

In view of the above, the nonaqueous solvent of one embodiment of the present invention, which is a mixed solvent of ethylene carbonate and an ionic liquid, is used as the solvent for the nonaqueous electrolyte in the power storage device. This enables the risks to be reduced and a power storage device with a high level of safety to be manufactured.

Specifically, a mixed solvent of a cyclic ester such as ethylene carbonate and an ionic liquid including an alicyclic quaternary ammonium cation in which substituents having different structures are bonded to a nitrogen atom is used.

In other words, the ionic liquid is an ionic liquid including an alicyclic quaternary ammonium cation having an asymmetrical structure. An example of the substituents is an alkyl group having 1 to 4 carbon atoms. Note that the substituents in the ionic liquid are not limited thereto and a variety of substituents can be used as long as the alicyclic quaternary ammonium cation has an asymmetrical structure.

In the alicyclic quaternary ammonium cation included in the ionic liquid, the number of carbon atoms of an alicyclic skeleton is preferably less than or equal to 5 in view of the stability, viscosity, and ion conductivity of a compound and ease of synthesis. In other words, a quaternary ammonium cation in which the length of a ring is shorter than that of a six-membered ring is preferably used.

The anion included in the ionic liquid is a monovalent anion which forms the ionic liquid with the alicyclic quaternary ammonium cation. Examples of the anion include a monovalent imide anion, a monovalent methide anion, a perfluoroalkyl sulfonic acid anion, tetrafluoroborate ($BF_4^-$) and hexafluorophosphate ($PF_6^-$). As a monovalent imide anion, $(C_nF_{2n+1}SO_2)_2N^-$ (n=0 to 3), $CF_2(CF_2SO_2)_2N^-$, and the like can be given. As a perfluoroalkyl sulfonic acid anion, $(C_mF_{2m+1}SO_3)^-$ (m=0 to 4) and the like can be given. Note that the anion is not limited thereto as long as the anion can form the ionic liquid with the alicyclic quaternary ammonium cation.

The above ionic liquid corresponds to an ionic liquid represented by General Formula (G2) or General Formula (G3). Note that the nonaqueous solvent of one embodiment of the present invention may include the ionic liquids represented by both Genera Formulae (G2) and (G3) without limitation to the ionic liquid represented by either general formula. The nonaqueous solvent of one embodiment of the present invention may include a plurality of ionic liquids which are represented by General Formula (G2) and have substituents in different positions of an alicyclic skeleton, or a plurality of ionic liquids which are represented by General Formula (G3) and have substituents in different positions of an alicyclic skeleton. The freezing point of the nonaqueous solvent is depressed more in the case where the nonaqueous solvent includes a plurality of ionic liquids as described above than in the case where the nonaqueous solvent includes only one ionic liquid. Thus, the use of a nonaqueous solvent including a plurality of ionic liquids enables a power storage device to be operated in a low-temperature environment, so that a power storage device which can be operated in a wide temperature range can be manufactured.

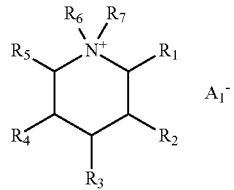

(G2)

In General Formula (G2), $R_1$ to $R_5$ each represent a hydrogen atom or an alkyl group having 1 to 20 carbon atoms; $R_6$ and $R_7$ represent different alkyl groups having 1 to 4 carbon atoms; $A_1^-$ represents any of a monovalent imide anion, a monovalent methide anion, a perfluoroalkyl sulfonic acid anion, tetrafluoroborate ($BF_4$), and hexafluorophosphate ($PF_6^-$).

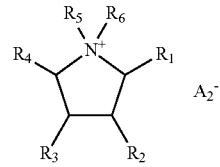

(G3)

In General Formula (G3), $R_1$ to $R_4$ each represent a hydrogen atom or an alkyl group having 1 to 20 carbon atoms; $R_5$ and $R_6$ represent difference alkyl groups having 1 to 4 carbon atoms; $A_2^-$ represents any of a monovalent imide anion, a monovalent methide anion, a perfluoroalkyl sulfonic acid anion, tetrafluoroborate ($BF_4$), and hexafluorophosphate ($PF_6^-$).

Thus, the nonaqueous solvent of one embodiment of the present invention is preferably a mixed solvent of ethylene carbonate and one or both of the ionic liquids represented by General Formula (G2) and General Formula (G3).

The ionic liquid represented by General Formula (G2) can be, for example, an ionic liquid represented by General Formula (G1) in which $R_6$ and $R_7$ of the alicyclic quaternary ammonium cation in the ionic liquid represented by General Formula (G2) are a methyl group and a propyl group, respectively.

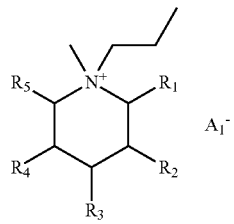

(G1)

In General Formula (G1), $R_1$ to $R_5$ each represent a hydrogen atom or an alkyl group having 1 to 20 carbon atoms; $A_1^-$ represents any of a monovalent imide anion, a monovalent methide anion, a perfluoroalkyl sulfonic acid anion, tetrafluoroborate ($BF_4^-$), and hexafluorophosphate ($PF_6^-$).

The ionic liquid represented by General Formula (G3) can be, for example, an ionic liquid represented by General Formula (G4) in which $R_5$ and $R_6$ of the alicyclic quaternary ammonium cation in the ionic liquid represented by General Formula (G3) are a methyl group and a propyl group, respectively.

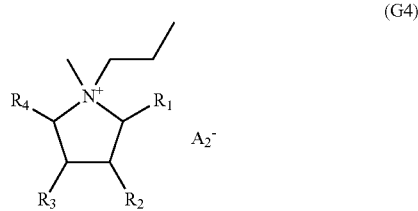

(G4)

In General Formula (G4), $R_1$ to $R_4$ each represent a hydrogen atom or an alkyl group having 1 to 20 carbon atoms; $A_2^-$ represents any of a monovalent imide anion, a monovalent methide anion, a perfluoroalkyl sulfonic acid anion, tetrafluoroborate ($BF_4^-$), and hexafluorophosphate ($PF_6^-$).

Thus, the nonaqueous solvent of one embodiment of the present invention is preferably a mixed solvent of ethylene carbonate and one or both of the ionic liquids represented by General Formula (G1) and General Formula (G4).

Note that $R_1$ to $R_5$ in the ionic liquid represented by General Formula (G1) or (G2) and $R_1$ to $R_4$ in the ionic liquid represented by General Formula (G3) or (G4) are electron donating substituents such as an alkyl group having 1 to 20 carbon atoms. The alkyl group may be either a straight-chain alkyl group or a branched-chain alkyl group. Note that $R_1$ to $R_5$ are not limited thereto as long as $R_1$ to $R_5$ have electron donating properties. Further, $R_1$ to $R_5$ are not even limited to electron donating substituents and may be, for example, a methoxy group, a methoxymethyl group, or a methoxyethyl group.

Here, reduction resistance and oxidation resistance of a nonaqueous solvent including an ionic liquid (specifically, a nonaqueous electrolyte including the nonaqueous solvent), which is included in a power storage device, is described. The nonaqueous solvent included in the power storage device preferably has excellent reduction resistance and oxidation resistance. In the case of low reduction resistance, the ionic liquid included in the nonaqueous solvent accepts electrons from a negative electrode to be reduced and decomposed. As a result, characteristics of the power storage device deteriorate. "Reduction of an ionic liquid" means that an ionic liquid accepts electrons from a negative electrode. Thus, by making it difficult particularly for a cation having a positive charge, which is included in the ionic liquid, to accept electrons, the reduction potential of the ionic liquid can be reduced. For this reason, the alicyclic quaternary ammonium cation in the ionic liquid represented by any of General Formulae (G1) to (G4) preferably has an electron donating substituent. Note that the reduction in reduction potential means an improvement in reduction resistance (also referred to as stability against reduction).

In other words, the above electron donating substituent is preferably used as $R_1$ to $R_5$ in the ionic liquid represented by General Formula (G1) or (G2) or $R_1$ to $R_4$ in the ionic liquid represented by General Formula (G3) or (G4). For example, when the above electron donating substituent is used as $R_1$ to $R_5$ in the ionic liquid represented by General Formula (G1) or (G2) or $R_1$ to $R_4$ in the ionic liquid represented by General Formula (G3) or (G4), inductive effects occur and electric polarization of the alicyclic quaternary ammonium cation is alleviated because of the inductive effects. Thus, it becomes difficult for the alicyclic quaternary ammonium cation to accept electrons, so that the reduction potential of the ionic liquid can be reduced.

Further, the reduction potential of the ionic liquid included in the nonaqueous solvent of one embodiment of the present invention is preferably lower than oxidation-reduction potential of lithium ($Li/Li^+$), which is a typical low-potential negative electrode material.

However, as the number of electron donating substituents increases, the viscosity of the ionic liquid tends to increase. For this reason, the number of electron donating substituents is preferably adjusted depending on the desired reduction potential and desired viscosity as appropriate.

When $R_1$ to $R_5$ in the ionic liquid represented by General Formula (G1) or (G2) or $R_1$ to $R_4$ in the ionic liquid represented by General Formula (G3) or (G4) are alkyl groups having 1 to 20 carbon atoms, the number of carbon atoms is preferably small (e.g., 1 to 4), in which case the viscosity of the ionic liquid can be reduced. As a result, the viscosity of the nonaqueous solvent of one embodiment of the present invention can be reduced.

Further, since the nonaqueous solvent of one embodiment of the present invention includes ethylene carbonate, the viscosity of the nonaqueous solvent can be reduced.

Oxidation potential of the ionic liquid changes depending on anionic species. Thus, in order to obtain an ionic liquid having high oxidation potential, the anion in the ionic liquid contained in the nonaqueous solvent of one embodiment of the present invention is preferably a monovalent anion selected from $(C_nF_{2n+1}SO_2)_2N^-$ (n=0 to 3), $CF_2(CF_2SO_2)_2N^-$, and $(C_mF_{2m+1}SO_3)^-$ (m=0 to 4). Note that the high oxidation potential means an improvement in oxidation resistance (also referred to as stability against oxidation). The oxidation resistance is improved by the interaction between a cation in which electric polarization is alleviated because of an electron donating substituent and the anion described above.

Thus, by using the ionic liquid having improved reduction resistance and oxidation resistance (widened oxidation-reduction potential window) in the nonaqueous solvent of one embodiment of the present invention, decomposition of the nonaqueous solvent (i.e., the nonaqueous electrolyte including the nonaqueous solvent) due to charging and discharging can be suppressed. Thus, the use of the nonaqueous solvent of one embodiment of the present invention enables a highly reliable power storage device which has good cycle characteristics to be manufactured. Moreover, the use of the above ionic liquid in the nonaqueous solvent of one embodiment of the present invention allows selection of a low-potential negative electrode material and a high-potential positive electrode material, so that a power storage device which has high energy density can be manufactured.

Further, by reducing the viscosity of the nonaqueous solvent of one embodiment of the present invention (specifically, the nonaqueous electrolyte including the nonaqueous solvent), the ion conductivity of the nonaqueous solvent can be improved. Thus, the use of the nonaqueous solvent of one embodiment of the present invention enables a power storage device which has good charging and discharging rate characteristics to be manufactured. In the case where $R_1$ to $R_5$ in the ionic liquid represented by General Formula (G1)

or (G3) are alkyl groups having 1 to 20 carbon atoms, the smaller number of carbon atoms (e.g., 1 to 4) enables the viscosity of the ionic liquid to be reduced. As a result, the viscosity of the nonaqueous solvent of one embodiment of the present invention can be reduced.

Many organic solvents such as ethylene carbonate have volatility and a low flash point. For this reason, when a single solvent, i.e., ethylene carbonate is used as a nonaqueous solvent for a nonaqueous electrolyte of a power storage device, risks of ignition of the nonaqueous electrolyte or explosion of the power storage device might be caused by an increase in the internal temperature of the power storage device. Meanwhile, the nonaqueous solvent of one embodiment of the present invention includes the ionic liquid which has non-flammability and non-volatility; thus, a nonaqueous electrolyte including the nonaqueous solvent is difficult to ignite even when the internal temperature of a power storage device is increased. Thus, the use of the nonaqueous solvent of one embodiment of the present invention enables a power storage device with a high level of safety to be manufactured.

The nonaqueous solvent of one embodiment of the present invention (specifically, the nonaqueous electrolyte including the nonaqueous solvent) includes ethylene carbonate as well as the ionic liquid. Thus, the ion conductivity of the nonaqueous solvent can be improved more than in the case where a single solvent of the ionic liquid is used as the nonaqueous solvent for the nonaqueous electrolyte of the power storage device. Thus, the use of the nonaqueous solvent of one embodiment of the present invention enables a power storage device which has good charging and discharging rate characteristics to be manufactured.

On the basis of the above description, the ionic liquid content in the nonaqueous solvent of one embodiment of the present invention is preferably greater than or equal to 70 wt % and less than 100 wt % per unit weight of the ionic liquid and the cyclic ester in the nonaqueous electrolyte, or greater than or equal to 50 wt % and less than 80 wt % per unit weight of the nonaqueous electrolyte. By using the nonaqueous solvent of one embodiment of the present invention which has the above ionic liquid content for a power storage device, a CV charging period in CCCV charging can be prevented from being extended. Moreover, the nonaqueous solvent of one embodiment of the present invention is less likely to ignite even when the internal temperature of the power storage device is increased, and has good ion conductivity. Thus, a power storage device which has a high level of safety, high reliability, and good charging and discharging rate characteristics can be manufactured.

<Synthesis Method of Ionic Liquid Represented by General Formula (G1)>

Here, a method for synthesizing the ionic liquid described in this embodiment is described. A variety of reactions can be applied to the method for synthesizing the ionic liquid described in this embodiment. For example, the ionic liquid represented by General Formula (G1) can be synthesized by a synthesis method described below. Here, an example is described referring to Synthesis Scheme (S-1). Note that the method for synthesizing the ionic liquid described in this embodiment is not limited to the synthesis method below.

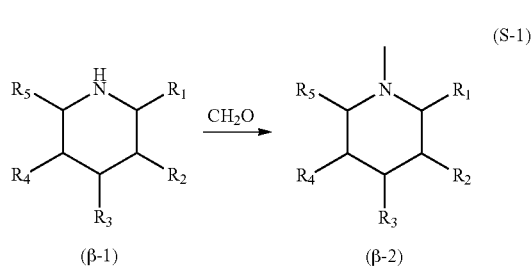

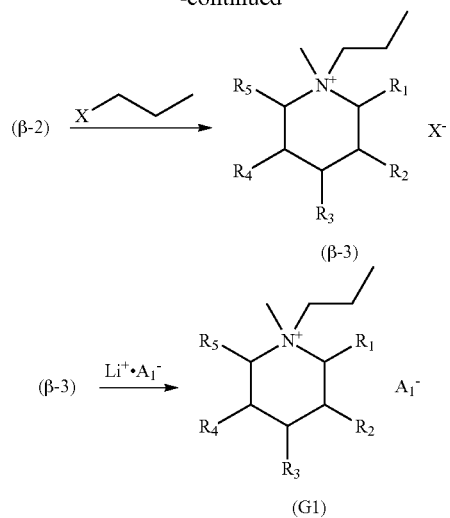

In Synthesis Scheme (S-1), the reaction from General Formula (β-1) to General Formula (β-2) is alkylation of amine by an amine compound and a carbonyl compound in the presence of hydride. For example, excessive formic acid can be used as the hydride source. Here, $CH_2O$ is used as the carbonyl compound.

In Synthesis Scheme (S-1), the reaction from General Formula (β-2) to General Formula (β-3) is alkylation by a tertiary amine compound and an alkyl halide compound, which synthesizes a quaternary ammonium salt. Here, propane halide is used as the alkyl halide compound. Note that X represents halogen, and the halogen is preferably bromine or iodine, more preferably iodine, in terms of high reactivity.

Through ion exchange between the quaternary ammonium salt represented by General Formula (β-3) and a desired metal salt including $A_1^-$, the ionic liquid represented by General Formula (G1) can be obtained. An example of the metal salt that can be used includes a potassium salt.

<Method for Synthesizing Ionic Liquid Represented by General Formula (G4)>

A variety of reactions can be applied to the ionic liquid represented by General Formula (G4). Here, an example is described referring to Synthesis Scheme (S-2). Note that the method for synthesizing the ionic liquid described in this embodiment is not limited to the synthesis method below.

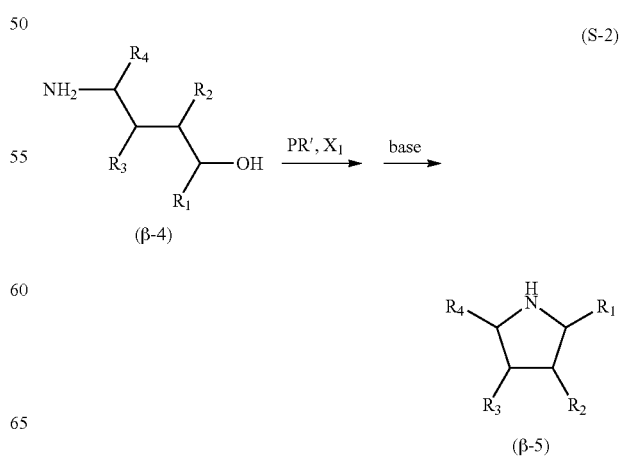

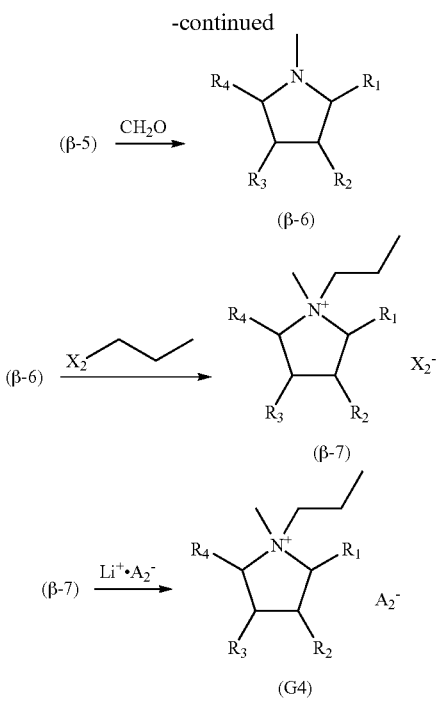

In Synthesis Scheme (S-2), a reaction from General Formula (β-4) to General Formula (β-5) is a ring closure reaction of amino alcohol which passes through halogenation using a halogen source and trisubstituted phosphine such as trialkylphosphine. Note that PR' represents trisubstituted phosphine and $X_1$ represents a halogen source. As the halogen source, carbon tetrachloride, carbon tetrabromide, iodine, iodomethane, or the like can be used. Here, triphenylphosphine is used as the trisubstituted phosphine and carbon tetrachloride is used as the halogen source.

In Synthesis Scheme (S-2), the reaction from General Formula (β-5) to General Formula (β-6) is alkylation of amine by an amine compound and a carbonyl compound in the presence of hydride. For example, excessive formic acid can be used as the hydride source. Here, $CH_2O$ is used as the carbonyl compound.

In Synthesis Scheme (S-2), the reaction from General Formula (β-6) to General Formula (β-7) is alkylation by a tertiary amine compound and an alkyl halide compound, which synthesizes a quaternary ammonium salt. Here, propane halide is used as the alkyl halide compound. Further, $X^2$ represents a halogen. The halogen is preferably bromine or iodine, more preferably iodine, in terms of high reactivity.

Through ion exchange between the quaternary ammonium salt represented by General Formula (β-7) and a desired metal salt including $A_2^-$, the ionic liquid represented by General Formula (G4) can be obtained. An example of the metal salt that can be used includes a potassium salt. Note that $A_2^-$ is similar to $A_1^-$ described in Synthesis Scheme (S-1).

As described above, the mixed solvent of the cyclic ester such as ethylene carbonate and the ionic liquid including an alicyclic quaternary ammonium cation in which substituents having different structures are bonded to a nitrogen atom, which is the nonaqueous solvent of one embodiment of the present invention, is used as a solvent for the nonaqueous electrolyte of the power storage device, whereby a CV charging period in CCCV charging can be prevented from being extended; thus, ignition of the nonaqueous electrolyte and explosion of the power storage device can be prevented. Moreover, the nonaqueous solvent of one embodiment of the present invention has non-flammability, can suppress a decomposition reaction of the nonaqueous electrolyte, and has good ion conductivity; thus, a power storage device which has a high level of safety, high reliability, and good charging and discharging rate characteristics can be provided.

This embodiment can be implemented in appropriate combination with any of the structures described in the other embodiments.

(Embodiment 2)

In this embodiment, a power storage device of one embodiment of the present invention and a manufacturing method of the power storage device are described. The power storage device of one embodiment of the present invention includes a positive electrode, a negative electrode, a nonaqueous electrolyte, and a separator. In this embodiment, a coin-type secondary battery is described as an example.

<Structure of Coin-Type Secondary Battery>

FIG. 1A is a perspective view of a coin-type secondary battery 100. In the coin-type secondary battery 100, a housing 111 is provided over a housing 109 with a gasket 121 provided therebetween. The housings 109 and 111 have conductivity and thus serve as external terminals.

Figure 1B:
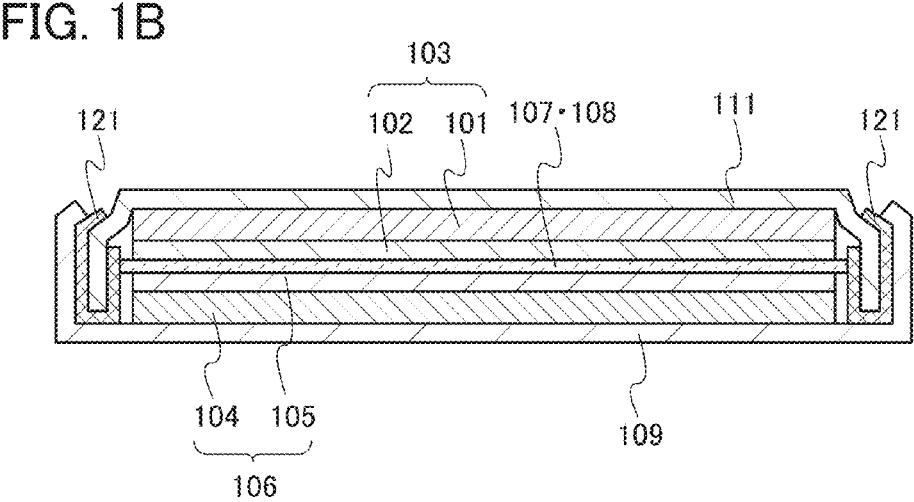

FIG. 1B is a cross-sectional view of the coin-type secondary battery 100 in the direction perpendicular to a top surface of the housing 111.

The coin-type secondary battery 100 includes a positive electrode 103 including a positive electrode current collector 101 and a positive electrode active material layer 102, a negative electrode 106 including a negative electrode current collector 104 and a negative electrode active material layer 105, and a separator 108 sandwiched between the positive electrode 103 and the negative electrode 106. Note that a nonaqueous electrolyte 107 is included in the separator 108. The positive electrode current collector 101 and the negative electrode current collector 104 are connected to the housing 111 and the housing 109, respectively. An end portion of the housing 111 is embedded in the gasket 121, whereby the isolation between the housing 109 and the housing 111 is maintained by the gasket 121.

The detailed description of the coin-type secondary battery 100 is given below.

The positive electrode current collector 101 can be formed using a material having high conductivity such as a metal typified by stainless steel, gold, platinum, zinc, iron, copper, aluminum, or titanium, or an alloy thereof. Alternatively, the positive electrode current collector 101 can be formed using an aluminum alloy to which an element which improves heat resistance, such as silicon, titanium, neodymium, scandium, or molybdenum, is added. Further alternatively, the positive electrode current collector 101 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (sheet-like shape), a net-like shape, a punching-metal shape, an expanded-metal shape, or the like as appropriate.

As the positive electrode active material layer 102, a substance including carrier ions of the coin-type secondary battery 100 and a transition metal (i.e., positive electrode active material) is used, for example.

Alkali metal ions, alkaline earth metal ions, beryllium ions, or magnesium ions can be used as the carrier ions of the coin-type secondary battery 100. Examples of the alkali metal ions include lithium ions, sodium ions, and potassium ions. Examples of the alkaline earth metal ions include calcium ions, strontium ions, and barium ions.

As the positive electrode active material, a material represented by General Formula $A_hM_iPO_j$ (h>0, i>0, j>0) can also be used, for example. Here, A represents, for example, an alkali metal such as lithium, sodium, or potassium; an alkaline earth metal such as calcium, strontium, or barium; beryllium; or magnesium. M represents a transition metal such as iron, nickel, manganese, or cobalt, for example. Thus, examples of the material represented by General Formula $A_hM_iPO_j$ (h>0, i>0, j>0) include lithium iron phosphate and sodium iron phosphate. Note that one or more of any of the above-described metals can be selected as A or M.

Alternatively, a material represented by General Formula $A_hM_iO_j$ (h>0, i>0, j>0) can be used. Here, A represents, for example, an alkali metal such as lithium, sodium, or potassium; an alkaline earth metal such as calcium, strontium, or barium; beryllium; or magnesium. M represents a transition metal such as iron, nickel, manganese, or cobalt, for example. Thus, examples of the material represented by General Formula $A_hM_iO_j$ (h>0, i>0, j>0) include lithium cobaltate, lithium manganate, and lithium nickelate. Note that one or more of any of the above-described metals can be selected as A or M.

In the case where lithium ions are used as the carrier ions of the coin-type secondary battery 100 and thus the coin-type secondary battery 100 serves as a coin-type lithium secondary battery, a positive electrode active material including lithium is preferably selected for the positive electrode active material layer 102. In other words, A in General Formula $A_hM_iPO_j$ (h>0, i>0, j>0) or $A_hM_iO_j$ (h>0, i>0, j>0) is preferably lithium.

Further, a binding body including a conductive additive (e.g., acetylene black (AB)), a binder (e.g., polyvinylidene fluoride (PVDF)), and the like may be used as the positive electrode active material layer 102. In this specification, the term "positive electrode active material layer" refers to a layer at least including the positive electrode active material, and the positive electrode active material including a conductive additive, a binder, and the like is also referred to as the "positive electrode active material layer."

Note that the conductive additive is not limited to the above-described material, and as the conductive additive, an electron-conductive material can be used as long as it is not chemically changed in the power storage device. For example, a carbon-based material such as graphite or carbon fibers; a metal material such as copper, nickel, aluminum, or silver; or a powder or fiber of a mixture of the carbon-based material and the metal material can be used.

As the binder, polysaccharides such as starch, carboxymethyl cellulose, hydroxypropyl cellulose, regenerated cellulose, and diacetyl cellulose; vinyl polymers such as polyvinyl chloride, polyvinyl pyrrolidone, polytetrafluoroethylene, polyvinylidene fluoride, polyethylene, polypropylene, polyvinyl alcohol, ethylene-propylene-diene monomer (EPDM) rubber, sulfonated EPDM rubber, styrene-butadiene rubber, butadiene rubber, and fluorine rubber; polyether such as polyethylene oxide; and the like can be given.

In the positive electrode active material layer 102, graphene or multilayer graphene may be used instead of the conductive additive and the binder. Note that in this specification, the graphene refers to a one-atom-thick sheet of carbon molecules having $sp^2$ bonds. Further, the multilayer graphene refers to a stack of 2 to 100 sheets of graphene. The graphene and the multilayer graphene may contain less than or equal to 15 at. % of an element other than carbon, such as oxygen or hydrogen. Note that graphene or multilayer graphene to which an alkali metal such as potassium is added may also be used.

Figure 2A:
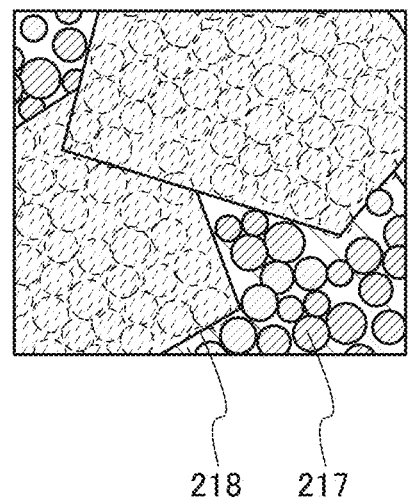
FIGS. 2A and 2B are a plan view and a cross-sectional view illustrating an electrode structure of a secondary battery of one embodiment of the present invention.

FIG. 2A is a plan view of the positive electrode active material layer 102 using the graphene instead of the conductive additive and the binder. The positive electrode active material layer 102 in FIG. 2A includes a positive electrode active material 217 which is a particle and graphenes 218 which cover a plurality of particles of the positive electrode active material 217 and at least partly surround the plurality of particles of the positive electrode active material 217. The different graphenes 218 cover surfaces of the plurality of particles of the positive electrode active material 217. Note that the positive electrode active material 217 may be exposed in part of the positive electrode active material layer 102.

Graphene is chemically stable and has favorable electric characteristics. Graphene has high conductivity because six-membered rings each composed of carbon atoms are connected in the planar direction. That is, graphene has high conductivity in the planar direction. Graphene has a sheet-like shape and a gap is provided between stacked graphene layers in the direction parallel to the plane, so that ions can transfer in the gap. However, the transfer of ions in the direction perpendicular to the graphene layers is difficult.

The size of the particle of the positive electrode active material 217 is preferably greater than or equal to 20 nm and less than or equal to 100 nm. Note that the size of the particle of the positive electrode active material 217 is preferably smaller because electrons transfer in the positive electrode active material 217.

Sufficient characteristics can be obtained even when the surface of the positive electrode active material 217 is not covered with a graphite layer; however, it is preferable to use both the graphene and the positive electrode active material covered with a graphite layer because carriers transfer hopping between the positive electrode active materials, so that current flows.

Figure 2B:
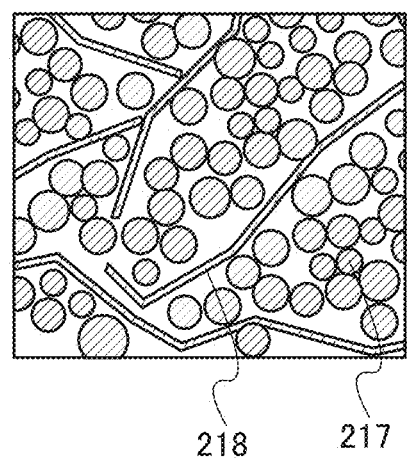

FIG. 2B is a cross-sectional view of part of the positive electrode active material layer 102 in FIG. 2A. The positive electrode active material layer 102 in FIG. 2A contains the positive electrode active material 217 and the graphenes 218 which cover the positive electrode active material 217. The graphenes 218 each have a linear shape when observed in the cross-sectional view. A plurality of particles of the positive electrode active material is at least partly surrounded with one graphene or plural graphenes. That is, the plurality of particles of the positive electrode active material exists within one graphene or among plural graphenes. Note that the graphene has a bag-like shape, and the plurality of particles of the positive electrode active material is surrounded with the bag-like portion in some cases. In addition, the plurality of particles of the positive electrode active material is not covered with the graphenes and partly exposed in some cases.

As the thickness of the positive electrode active material layer 102, a desired thickness is selected from the range of 20 μm to 100 μm. It is preferable to adjust the thickness of the positive electrode active material layer 102 as appropriate so that a crack and separation are not caused.

As an example of the positive electrode active material, a material whose volume is expanded by insertion of carrier ions is given. In a power storage device using such a material, a positive electrode active material layer gets vulnerable and is partly pulverized or collapsed by charging and discharging, resulting in lower reliability of the power storage device. However, in the positive electrode active material layer using the graphene or multilayer graphene, even when the volume of the positive electrode active material expands because of charging and discharging, the graphene is provided in the periphery of the particles of the positive electrode active material; thus, the positive electrode active material layer is prevented from being pulverized or collapsed. That is to say, the graphene or multilayer graphene has a function of maintaining the bond between the particles of the positive electrode active material even when the volume of the positive electrode active material fluctuates by charging and discharging. Therefore, the power storage device can have high reliability.

The use of the graphene or multilayer graphene instead of a conductive additive and a binder leads to a reduction in the amount of the conductive additive and the binder in the positive electrode 103. In other words, the weight of the positive electrode 103 can be reduced; consequently, the capacity of the battery per unit weight of the electrode can be increased.

Note that the positive electrode active material layer 102 may contain acetylene black particles having a volume 0.1 to 10 times as large as that of the graphene, carbon particles having a one-dimensional expansion (e.g., carbon nanofibers), or other known binders.

Next, the negative electrode current collector 104 can be formed using a metal material such as gold, platinum, zinc, iron, copper, aluminum, nickel, titanium, or an alloy material including a plurality of these metal materials (e.g., stainless steel). Note that the negative electrode current collector 104 is preferably formed using an aluminum alloy to which an element which improves heat resistance, such as silicon, titanium, neodymium, scandium, or molybdenum, is added. Alternatively, the negative electrode current collector 104 may be formed using a metal material which forms silicide by reacting with silicon. Examples of the metal material which forms silicide by reacting with silicon include zirconium, titanium, hafnium, vanadium, niobium, tantalum, chromium, molybdenum, tungsten, cobalt, and nickel. The negative electrode current collector 104 can have a foil-like shape, a plate-like shape (sheet-like shape), a net-like shape, a punching-metal shape, an expanded-metal shape, or the like as appropriate.

There is no particular limitation on a material used for the negative electrode active material layer 105 as long as the material can dissolve and precipitate lithium or into/from which lithium ions can be inserted and extracted (i.e., negative electrode active material). For example, lithium, aluminum, a carbon-based material, tin, silicon, a silicon alloy, or germanium can be used as the negative electrode active material. Alternatively, a compound containing one or more of the above-described materials may be used. For the carbon-based material into/from which lithium ions can be intercalated and deintercalated, a graphite powder or graphite fiber (the graphite includes natural graphite, artificial graphite, or the like), or amorphous carbon such as carbon black, active carbon, soft carbon, or hard carbon can be used. The amount of lithium ions occluded by silicon, a silicon alloy, germanium, lithium, aluminum, and tin is larger than that by the carbon-base material. Therefore, the negative electrode active material layer 105 can be formed using a less amount of material, which enables reductions in cost and the size of the coin-type secondary battery 100.

Alternatively, one of the above-described materials which are applicable to the negative electrode active material layer 105 may be used alone as the negative electrode 106 without the use of the negative electrode current collector 104.

Further alternatively, graphene or multilayer graphene may be formed on the surface of the negative electrode active material layer 105. In that case, it is possible to suppress influence of dissolution or precipitation of lithium or occlusion (insertion) or release (extraction) of lithium ions on the negative electrode active material layer 105. The influence refers to pulverization or separation of the negative electrode active material layer 105 which is caused by expansion or contraction of the negative electrode active material layer 105.

As the nonaqueous electrolyte 107, the nonaqueous electrolyte described in Embodiment 1 can be used. In this embodiment, a lithium salt including lithium ions that are carrier ions is used so that the coin-type secondary battery 100 serves as a lithium secondary battery. As the lithium salt, any of the lithium salts described in Embodiment 1 can be used.

Note that as the salt included in the nonaqueous electrolyte 107, a salt can be used as long as it includes any of the above-described carrier ions and corresponds to the positive electrode active material layer 102. For example, when carrier ions of the coin-type secondary battery 100 are alkali metal ions other than lithium ions or alkaline earth metal ions, an alkali metal salt (e.g., a sodium salt or a potassium salt), an alkaline earth metal salt (e.g., a calcium salt, a strontium salt, or a barium salt), a beryllium salt, a magnesium salt, or the like may be used. The nonaqueous electrolyte 107 including the salt has the freezing point lower than that of the nonaqueous electrolyte described in Embodiment 1. Thus, the coin-type secondary battery 100 including the nonaqueous electrolyte 107 can be operated in a low-temperature environment, that is, the operating temperature can be widened.

Alternatively, the nonaqueous electrolyte described in Embodiment 1 may be gelled to be used as the nonaqueous electrolyte 107. With the use of the gelled nonaqueous electrolyte, safety against liquid leakage and the like is improved, and the coin-type secondary battery 100 can be made thin and lightweight. Note that there is no limitation on a high-molecular material used for gelation of the nonaqueous electrolyte as long as it can be used for the gelation of the nonaqueous electrolyte described in Embodiment 1. Examples of the high-molecular material include a silicon gel, an acrylic gel, an acrylonitrile gel, polyethylene oxide, polypropylene oxide, and a fluorine-based polymer.

As the separator 108, an insulating porous material is used. For example, paper; nonwoven fabric; a glass fiber; ceramics; or a synthetic fiber containing nylon (polyamide), vinylon (polyvinyl alcohol based fiber), polyester, acrylic, polyolefin, or polyurethane may be used. Note that a material which does not dissolve in the nonaqueous electrolyte 107 needs to be selected.

Although the coin-type secondary battery 100 which is sealed is described as the power storage device in this embodiment, the form of the power storage device is not limited thereto. That is, the power storage device of one embodiment of the present invention can have a variety of forms such as a laminated type, a cylindrical type, or a square type. Further, although the positive electrode 103, the negative electrode 106, and the separator 108 are stacked in the coin-type secondary battery 100, the positive electrode, the negative electrode, and the separator may be rolled up depending on the form of the power storage device.

<Method for Manufacturing Coin-Type Secondary Battery>

Next, a method for manufacturing the coin-type secondary battery 100 is described. First, a method for forming the positive electrode 103 is described.

Materials for the positive electrode current collector 101 and the positive electrode active material layer 102 are selected from the above-described materials. Here, lithium iron phosphate (LiFePO$_4$) is used as the positive electrode active material of the positive electrode active material layer 102.

The positive electrode active material layer 102 is formed over the positive electrode current collector 101. The positive electrode active material layer 102 may be formed by a coating method or a sputtering method using any of the above-described materials as a target. In the case of forming the positive electrode active material layer 102 by the coating method, a paste in which the positive electrode active material is mixed with a conductive additive, a binder, or the like is formed as slurry, and then the slurry is applied onto the positive electrode current collector 101 and dried. In the case of forming the positive electrode active material layer 102 by the coating method, pressure forming may also be employed, if necessary. In the above manner, the positive electrode 103 in which the positive electrode active material layer 102 is formed over the positive electrode current collector 101 can be formed.

In the case where the graphene or multilayer graphene is used in the positive electrode active material layer 102, at least the positive electrode active material and graphene oxide are mixed to form slurry, and the slurry is applied onto the positive electrode current collector 101 and dried. The drying is performed by heating in a reducing atmosphere. Thus, the positive electrode active material is baked and reduction treatment for extracting oxygen included in the graphene oxide can be performed, so that graphene can be formed. Note that graphene oxide in this specification refers to a compound formed by oxidation of the above graphene or multilayer graphene. When graphene oxide is reduced to form graphene or multilayer graphene, oxygen in the graphene oxide is not entirely extracted and partly remains in the graphene.

Next, a manufacturing method of the negative electrode 106 is described.

Materials for the negative electrode current collector 104 and the negative electrode active material layer 105 (negative electrode active material) may be selected from the above-described materials. A coating method, a chemical vapor deposition method, or a physical vapor deposition method may be used to form the negative electrode active material layer 105 over the negative electrode current collector 104. Note that in the case where a conductive additive and a binder are used for the negative electrode active material layer 105, a material selected from the above-described materials can be used as appropriate.

Figure 3A:
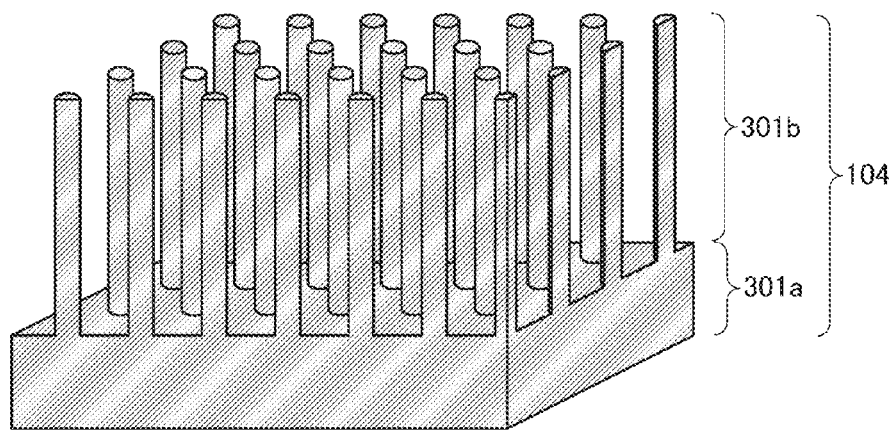
FIGS. 3A and 3B are perspective views illustrating a current collector structure and an electrode structure of a secondary battery of one embodiment of the present invention.

Here, other than the above-described shapes, the negative electrode current collector 104 may be processed to have a shape including protrusions and depressions as illustrated in FIG. 3A. FIG. 3A is a schematic cross-sectional view of an enlarged surface part of the negative electrode current collector. The negative electrode current collector 104 includes a plurality of protrusion portions 301b and a base portion 301a to which each of the plurality of protrusion portions is connected. Although the thin base portion 301a is illustrated in FIG. 3A, the base portion 301a is generally much thicker than the protrusion portions 301b.

The plurality of protrusion portions 301b extend in a direction substantially perpendicular to a surface of the base portion 301a. In this specification, the term "substantially" is used to mean a slight deviation from the perpendicular direction due to an error in leveling in a manufacturing process of the negative electrode current collector, step variation in a manufacturing process of the protrusion portions 301b, deformation due to repeated charge and discharge, and the like is acceptable although the angle between the surface of the base portion 301a and a center axis of the protrusion portion 301b in the longitudinal direction is preferably 90°. Specifically, the angle between the surface of the base portion 301a and the center axis of the protrusion portion 301b in the longitudinal direction is less than or equal to 90°±10°, preferably less than or equal to 90°±5°.

Note that the negative electrode current collector 104 including protrusions and depressions illustrated in FIG. 3A can be formed in such a manner that a mask is formed over the negative electrode current collector, the negative electrode current collector is etched with the use of the mask, and the mask is removed. Accordingly, in the case of forming the negative electrode current collector 104 including protrusions and depressions illustrated in FIG. 3A, titanium is preferably used for the negative electrode current collector 104. Titanium is a material very suitable for processing by dry etching and makes it possible to form protrusions and depressions with a high aspect ratio. Further, other than photolithography, the mask can be formed by an inkjet method, a printing method, or the like. In particular, the mask can be formed by nanoimprint lithography typified by thermal nanoimprint lithography and photo nanoimprint lithography.

Figure 3B:
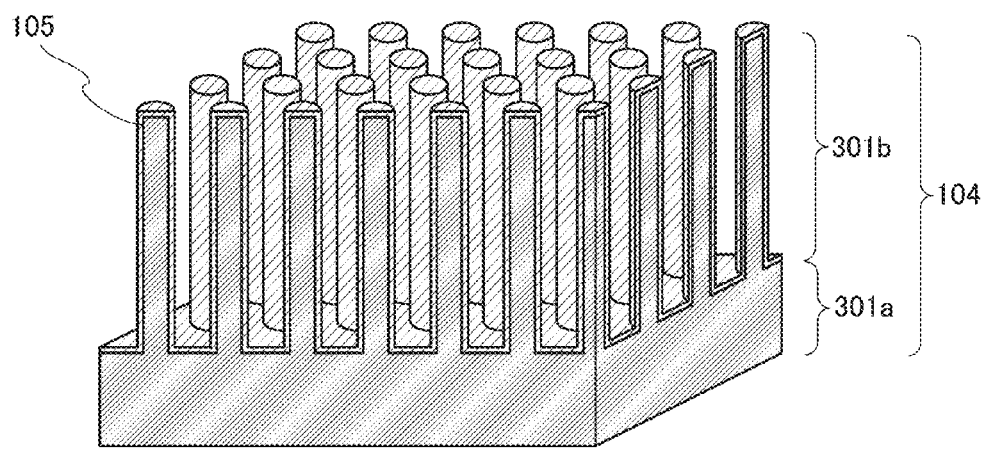

When the negative electrode active material layer 105 is formed over the negative electrode current collector 104 including protrusions and depressions illustrated in FIG. 3A, the negative electrode active material layer 105 is formed to cover the protrusions and depressions (see FIG. 3B).

Here, titanium foil is used for the negative electrode current collector 104, and silicon deposited by a chemical vapor deposition method or a physical vapor deposition method is used for the negative electrode active material layer 105.

In the case of using silicon as the negative electrode active material layer 105, amorphous silicon or crystalline silicon such as microcrystalline silicon, polycrystalline silicon, or single crystal silicon can be used as the silicon.

Alternatively, as the negative electrode active material layer 105, a layer obtained by forming microcrystalline silicon over the negative electrode current collector 104 and then removing amorphous silicon from the microcrystalline silicon by etching may be used. When the amorphous silicon is removed from the microcrystalline silicon, the surface area of the remaining microcrystalline silicon is increased. The microcrystalline silicon can be formed by, for example, a plasma chemical vapor deposition (CVD) method or a sputtering method.

Figure 4A:
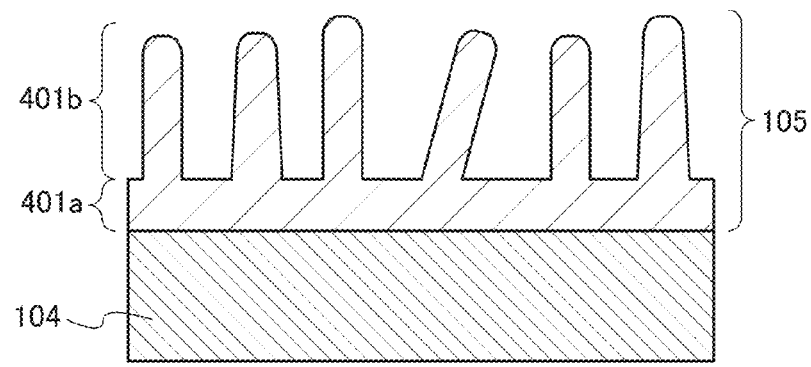
FIGS. 4A to 4C are cross-sectional views each illustrating an electrode structure of a secondary battery of one embodiment of the present invention.
Figure 4B:
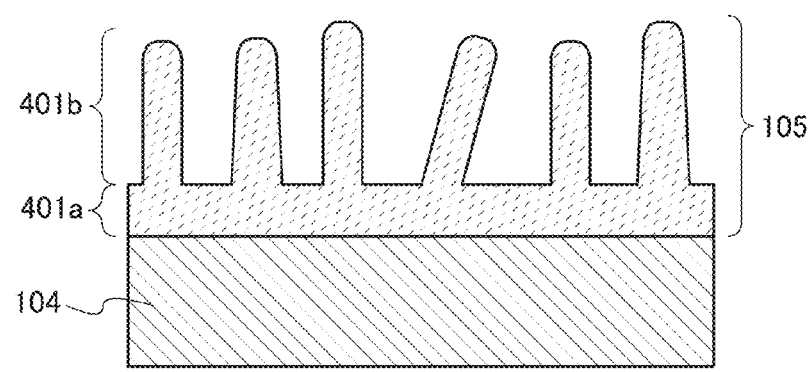
Figure 4C:
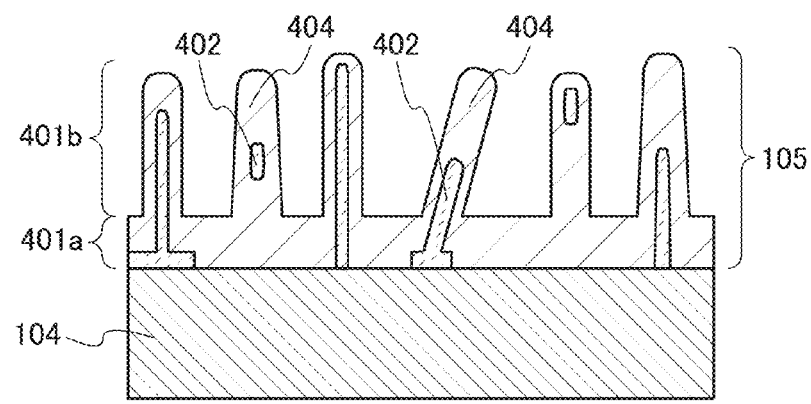

Further alternatively, the negative electrode active material layer 105 may be whisker-like silicon which is formed over the negative electrode current collector 104 with a low pressure (LP) CVD method (see FIGS. 4A to 4C). Note that in this specification, whisker-like silicon refers to silicon having a common portion 401a and a region 401b protruding from the common portion 401a like a whisker (or a string or a fiber).

When the whisker-like silicon is made of amorphous silicon, the volume of the whisker-like silicon is less likely to be changed due to occlusion and release of ions (e.g., stress due to volume expansion is relaxed), which can prevent pulverization or separation of the negative electrode active material layer due to repeated charging and discharging; thus, the cycle characteristics of the power storage device can be improved (see FIG. 4A).

When the whisker-like silicon is made of crystalline silicon such as microcrystalline silicon, polycrystalline silicon, or single crystal silicon, a crystal structure having excellent electron conductivity, excellent ion conductivity, and crystallinity is in contact with the current collector in a large area. Therefore, conductivity of the whole negative electrode can be improved, and the charging and discharging characteristics of the power storage device can be further improved (see FIG. 4B).

Further, the whisker-like silicon may include a core 402 made of crystalline silicon and an outer shell 404 made of amorphous silicon which covers the core (see FIG. 4C). In that case, the amorphous silicon that is the outer shell 404 has a characteristic in that the volume is less likely to be changed due to occlusion and release of ions (e.g., stress caused by expansion in volume is relieved). In addition, the crystalline silicon that is the core 402 has excellent electron conductivity and ion conductivity and has a characteristic in that the rate of occluding ions and the rate of releasing ions are high per unit mass. Therefore, with the use of the whisker-like silicon including the core 402 and the outer shell 404 as the negative electrode active material layer 105, the charging and discharging rate characteristics and cycle characteristics of the power storage device can be improved.

Note that in the common portion 401*a*, the crystalline silicon which forms the core 402 may be in contact with part of the top surface of the negative electrode current collector 104 as illustrated in FIG. 4C, or the entire top surface of the negative electrode current collector 104 may be in contact with the crystalline silicon.

The desired thickness of the negative electrode active material layer 105 is determined in the range of 20 µm to 100 µm.

Further, graphene or multilayer graphene can be formed on the surface of the negative electrode active material layer 105 in the following manner: the negative electrode current collector 104 which is provided with the negative electrode active material layer 105 is soaked together with a reference electrode in a solution containing graphene oxide, the solution is electrophoresed, and then heated so that reduction treatment is performed. Alternatively, the graphene or multilayer graphene can be formed on the surface of the negative electrode active material layer 105 by a dip coating method using the above solution; after dip coating is performed, reduction treatment is performed by heating.

Note that the negative electrode active material layer 105 may be predoped with lithium. Predoping with lithium can be performed in such a manner that a lithium layer is formed on the surface of the negative electrode active material layer 105 by a sputtering method. Alternatively, lithium foil is provided on the surface of the negative electrode active material layer 105, whereby the negative electrode active material layer 105 can be predoped with lithium.

The nonaqueous electrolyte 107 can be formed by the method described in Embodiment 1.

Then, the positive electrode 103, the separator 108, and the negative electrode 106 are immersed in with the nonaqueous electrolyte 107. Next, the negative electrode 106, the separator 108, the gasket 121, the positive electrode 103, and the housing 111 are stacked in this order over the housing 109, and the housing 109 and the housing 111 are crimped to each other with a "coin cell crimper." Thus, the coin-type secondary battery 100 can be manufactured.

Note that a spacer and a washer may be provided between the housing 111 and the positive electrode 103 or between the housing 109 and the negative electrode 106 so that the connection between the housing 111 and the positive electrode 103 or between the housing 109 and the negative electrode 106 is enhanced.

Although the lithium secondary battery is described as an example of the power storage device in this embodiment, the power storage device of one embodiment of the present invention is not limited to this. For example, with the use of the nonaqueous electrolyte of one embodiment of the present invention, a lithium ion capacitor can be manufactured.

The lithium ion capacitor can be manufactured as follows: a material capable of reversibly absorbing and extracting one or both of lithium ions and an anion is used to form a positive electrode; any of the above-described negative electrode active materials, a conductive high molecule such as a polyacene organic semiconductor (PAS), or the like is used to form a negative electrode; and the nonaqueous electrolyte described in Embodiment 1 is used.

Further, an electric double layer capacitor can be manufactured as follows: the material capable of reversibly absorbing and extracting one or both of lithium ions and an anion is used to form a positive electrode and a negative electrode; and the nonaqueous electrolyte described in Embodiment 1 is used.

This embodiment can be implemented in appropriate combination with any of the structures described in the other embodiments and examples.

(Embodiment 3)

A power storage device of one embodiment of the present invention can be used as a power supply of a variety of electrical appliances operated by electric power.

Specific examples of electrical appliances including the power storage device of one embodiment of the present invention include display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, video cameras, digital still cameras, high-frequency heating apparatus such as microwaves, electric rice cookers, electric washing machines, air-conditioning systems such as air conditioners, electric refrigerators, electric freezers, electric refrigerator-freezers, freezers for preserving DNA, and dialysis devices. In addition, moving objects driven by an electric motor using electric power from a power storage device are also included in the category of the electrical appliances. Examples of the moving objects include electric vehicles, hybrid vehicles which include both an internal-combustion engine and a motor, and motorized bicycles including motor-assisted bicycles.

In the electrical appliances, the power storage device of one embodiment of the present invention can be used as a power storage device for supplying enough electric power for almost the whole power consumption (such a power storage device is referred to as a main power supply). Alternatively, in the electrical appliances, the power storage device of one embodiment of the present invention can be used as a power storage device which can supply electric power to the electrical appliances when the supply of power from the main power supply or a commercial power supply is stopped (such a power storage device is referred to as an uninterruptible power supply). Further alternatively, in the electrical appliances, the power storage device of one embodiment of the present invention can be used as a power storage device for supplying electric power to the electrical appliances at the same time as the electric power supply from the main power supply or a commercial power supply (such a power storage device is referred to as an auxiliary power supply).

Figure 5:
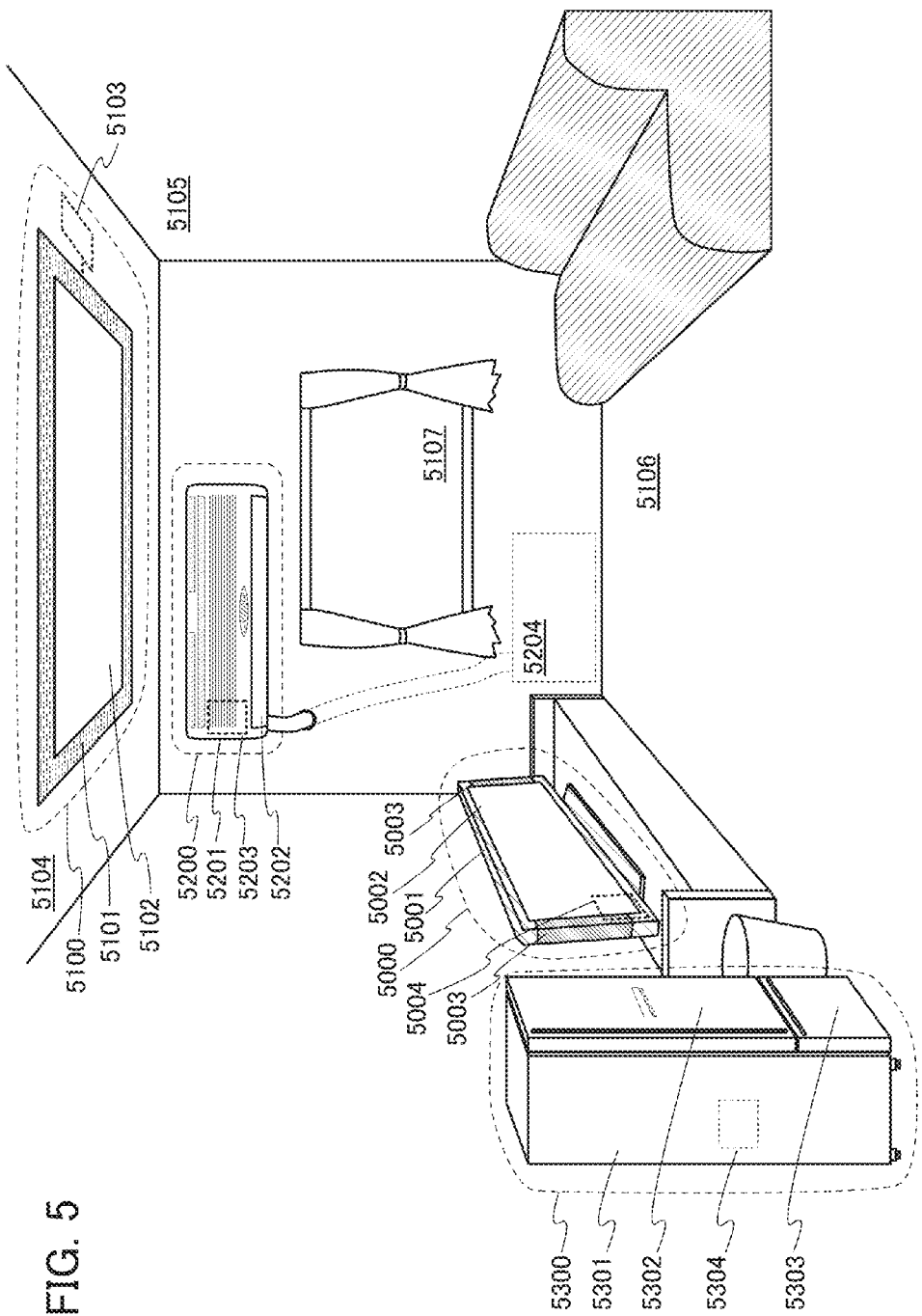
FIG. 5 illustrates electrical appliances each including a power storage device of one embodiment of the present invention.

FIG. 5 illustrates specific structures of the electrical appliances. In FIG. 5, a display device 5000 is an example of an electrical appliance including a power storage device of one embodiment of the present invention. Specifically, the display device 5000 corresponds to a display device for TV broadcast reception and includes a housing 5001, a display portion 5002, speaker portions 5003, a power storage device 5004, and the like. The power storage device 5004 is provided in the housing 5001. The display device 5000 can receive electric power from a commercial power supply. Alternatively, the display device 5000 can use electric power stored in the power storage device 5004. Thus, the display device 5000 can be operated with the use of the power storage device 5004 as an uninterruptible power supply even when power cannot be supplied from a commercial power supply because of power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 5, an installation lighting device 5100 is an example of an electrical appliance including a power storage device of one embodiment of the present invention. Specifically, the lighting device 5100 includes a housing 5101, a light source 5102, a power storage device 5103, and the like. FIG. 5 illustrates the case where the power storage device 5103 is provided in a ceiling 5104 on which the housing 5101 and the light source 5102 are installed; alternatively, the power storage device 5103 may be provided in the housing 5101. The lighting device 5100 can receive electric power from the commercial power supply. Alternatively, the lighting device 5100 can use electric power stored in the power storage device 5103. Thus, the lighting device 5100 can be operated with the use of the power storage device 5103 as an uninterruptible power supply even when power cannot be supplied from a commercial power supply because of power failure or the like.

Note that although the installation lighting device 5100 provided in the ceiling 5104 is illustrated in FIG. 5 as an example, the power storage device of one embodiment of the present invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which provides light artificially by using electric power can be used. Specifically, a discharge lamp such as an incandescent lamp and a fluorescent lamp, and a light-emitting element such as an LED and an organic EL element are given as examples of the artificial light source.

In FIG. 5, an air conditioner including an indoor unit 5200 and an outdoor unit 5204 is an example of an electrical appliance including a power storage device of one embodiment of the present invention. Specifically, the indoor unit 5200 includes a housing 5201, a ventilation duct 5202, a power storage device 5203, and the like. FIG. 5 illustrates the case where the power storage device 5203 is provided in the indoor unit 5200; alternatively, the power storage device 5203 may be provided in the outdoor unit 5204. Alternatively, the power storage devices 5203 may be provided in both the indoor unit 5200 and the outdoor unit 5204. The air conditioner can receive electric power from the commercial power supply. Alternatively, the air conditioner can use electric power stored in the power storage device 5203. Specifically, in the case where the power storage devices 5203 are provided in both the indoor unit 5200 and the outdoor unit 5204, the air conditioner can be operated with the use of the power storage device of one embodiment of the present invention as an uninterruptible power supply even when power cannot be supplied from a commercial power supply because of power failure or the like.

Note that although the separated air conditioner including the indoor unit and the outdoor unit is illustrated in FIG. 5 as an example, the power storage device of one embodiment of the present invention can be used in an air conditioner in which the functions of an indoor unit and an outdoor unit are integrated in one housing.

In FIG. 5, an electric refrigerator-freezer 5300 is an example of an electrical appliance including a power storage device of one embodiment of the present invention. Specifically, the electric refrigerator-freezer 5300 includes a housing 5301, a door for a refrigerator 5302, a door for a freezer 5303, a power storage device 5304, and the like. The power storage device 5304 is provided in the housing 5301 in FIG. 5. The electric refrigerator-freezer 5300 can receive power from a commercial power supply. Alternatively, the electric refrigerator-freezer 5300 can use power stored in the power storage device 5304. Thus, the electric refrigerator-freezer 5300 can be operated with use of the power storage device of one embodiment of the present invention as an uninterruptible power supply even when electric power cannot be supplied from the commercial power supply because of power failure or the like.

Note that among the electrical appliances described above, a high-frequency heating apparatus such as a microwave and an electrical appliance such as an electric rice cooker require high electric power in a short time. The tripping of a circuit breaker of a commercial power supply in use of the electrical appliances can be prevented by using the power storage device of one embodiment of the present invention as an auxiliary power supply for supplying electric power which cannot be supplied enough by the commercial power supply.

In addition, in a time period when electrical appliances are not used, specifically when the proportion of the amount of power which is actually used to the total amount of power which can be supplied by a commercial power supply source (such a proportion referred to as usage rate of power) is low, power can be stored in the power storage device, whereby the usage rate of power can be reduced in a time period when the electrical appliances are used. In the case of the electric refrigerator-freezer 5300, electric power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of electric power in daytime can be reduced.

This embodiment can be implemented in appropriate combination with any of the structures described in the other embodiments.

(Embodiment 4)

Next, a portable information terminal which is an example of electrical appliances will be described with reference to FIGS. 6A to 6C.

Figure 6A:
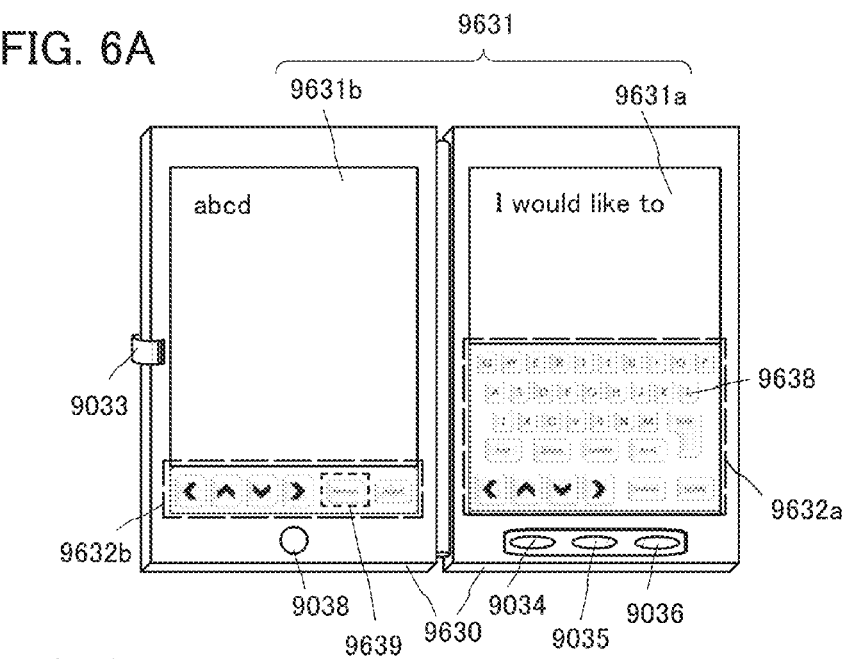
FIGS. 6A to 6C illustrate an electrical appliance including a power storage device of one embodiment of the present invention.
Figure 6B:
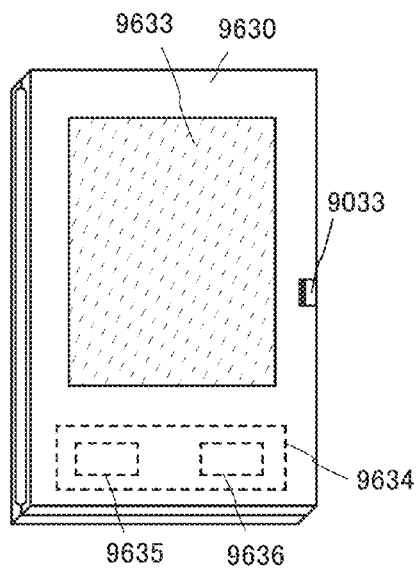

FIGS. 6A and 6B illustrate a tablet terminal that can be folded. In FIG. 6A, the tablet terminal is open (unfolded) and includes a housing 9630, a display portion 9631 including a display portion 9631a and a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a and data can be input when a displayed operation key 9638 is touched. Note that FIG. 6A illustrates, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 963 1b can be a touch panel region 9632b. Of operation keys displayed on the touch panel region 9632b, a switching button 9639 for showing/hiding a keyboard is touched with a finger, a stylus, or the like, so that keyboard buttons can be displayed on the display portion 9631b.

Touch input can be performed in the touch panel region 9632a and the touch panel region 9632b at the same time.

The switch 9034 for switching display modes can switch the display between portrait mode, landscape mode, and the like, and between monochrome display and color display, for example. With the switch 9036 for switching to power-saving mode, the luminance of display can be optimized in accordance with the amount of external light at the time when the tablet is in use, which is detected with an optical sensor incorporated in the tablet. The tablet may include another detection device such as a sensor for detecting orientation (e.g., a gyroscope or an acceleration sensor) in addition to the optical sensor.

Although FIG. 6A illustrates the example where the display area of the display portion 9631a is the same as that of the display portion 9631b, there is no particular limitation on the display portions 9631a and 963 1b. They may differ in size and/or image quality. For example, one display panel may be capable of higher-definition display than the other display panel.

In FIG. 6B, the tablet terminal is close (folded) and includes the housing 9630, a solar cell 9633, a charge/discharge control circuit 9634, a battery 9635, and a DC-to-DC converter 9636. In FIG. 6B, a structure including the battery 9635 and the DC-to-DC converter 9636 is illustrated as an example of the charge/discharge control circuit 9634. The battery 9635 includes the power storage device of one embodiment of the present invention.

Since the tablet terminal is foldable, the housing 9630 can be closed when the tablet terminal is not used. As a result, the display portion 9631a and the display portion 963 1b can be protected; thus, a tablet terminal which has excellent durability and excellent reliability also in terms of long-term use can be provided.

The tablet terminal illustrated in FIGS. 6A and 6B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, or the like. Note that the solar cell 9633 can be provided on one or both surfaces of the housing 9630, so that the battery 9635 can be charged efficiently. The use of the power storage device of one embodiment of the present invention as the battery 9635 has advantages such as a reduction in size.

The structure and operation of the charge/discharge control circuit 9634 illustrated in FIG. 6B is described with reference to a block diagram in FIG. 6C. The solar cell 9633, the battery 9635, the DC-to-DC converter 9636, a converter 9637, switches SW1 to SW3, and the display portion 9631 are illustrated in FIG. 6C, and the battery 9635, the DC-to-DC converter 9636, the converter 9637, and the switches SW1 to SW3 correspond to the charge/discharge control circuit 9634 illustrated in FIG. 6B.

First, an example of the operation in the case where electric power is generated by the solar cell 9633 using external light is described. The voltage of power generated by the solar cell is raised or lowered by the DC-to-DC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 may be turned off and the switch SW2 may be turned on so that the battery 9635 is charged.

Note that the solar cell 9633 is described as an example of a power generation means; however, without limitation thereon, the battery 9635 may be charged using another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Figure 6C:
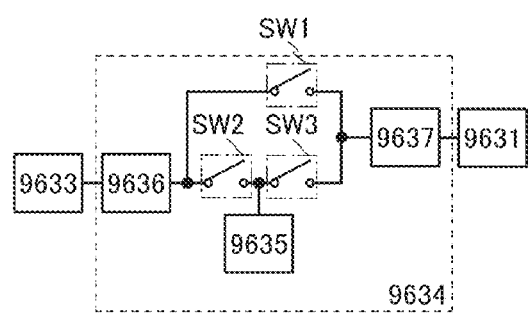

It is needless to say that one embodiment of the present invention is not limited to the electrical appliance illustrated in FIGS. 6A to 6C as long as the power storage device of one embodiment of the present invention is included.

This embodiment can be implemented in appropriate combination with any of the structures described in the other embodiments.

(Embodiment 5)

An example of a moving object driven by electric motors using electric power from the power storage device of one embodiment of the present invention is described with reference to FIGS. 7A and 7B.

The power storage device of one embodiment of the present invention can be used as a control battery. The control battery can be externally charged by electric power supply using plug-in systems or contactless power feeding. Note that in the case where the moving object is a train vehicle, the train vehicle can be charged by power supply from an overhead cable or a conductor rail.

Figure 7A:
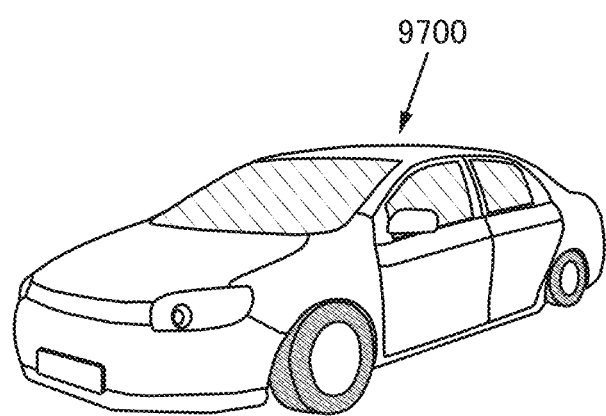
FIGS. 7A and 7B illustrate an electrical appliance including a power storage device of one embodiment of the present invention.
Figure 7B:
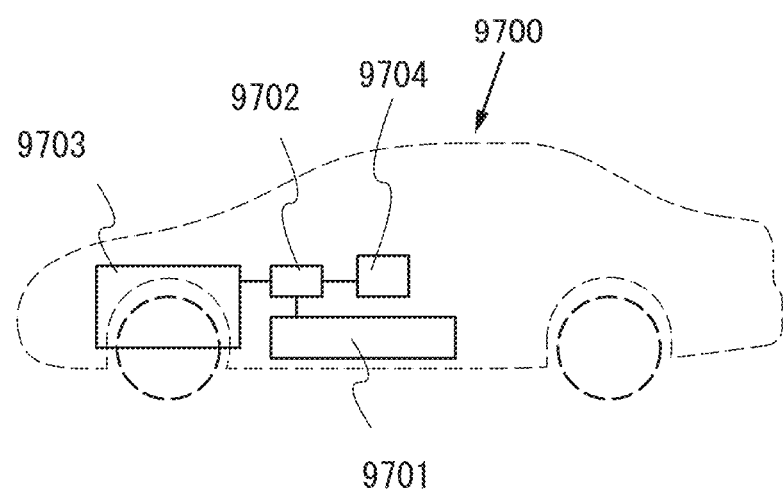

FIGS. 7A and 7B illustrate an example of an electric vehicle. An electric vehicle 9700 is equipped with a power storage device 9701. The output of the electric power of the power storage device 9701 is controlled by a control circuit 9702 and the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal-combustion engine. The processing unit 9704 outputs a control signal to the control circuit 9702 on the basis of input data such as data on operation (e.g., acceleration, deceleration, or stop) by a driver of the electric vehicle 9700 or data on driving the electric vehicle 9700 (e.g., data on an upgrade or a downgrade, or data on a load on a driving wheel). The control circuit 9702 adjusts the electric energy supplied from the power storage device 9701 in accordance with the control signal of the processing unit 9704 to control the output of the driving device 9703. In the case where the AC motor is mounted, although not illustrated, an inverter which converts direct current into alternate current is also incorporated.

The power storage device 9701 can be externally charged by electric power supply using a plug-in system. For example, the power storage device 9701 is charged through a power plug from a commercial power supply. The power storage device 9701 can be charged by converting external power into DC constant voltage having a predetermined voltage level through a converter such as an AC-DC converter. When the power storage device of one embodiment of the present invention is provided as the power storage device 9701, a shorter charging time can be brought about and improved convenience can be realized. Moreover, the higher charging and discharging rate of the power storage device 9701 can contribute to greater acceleration and excellent performance of the electric vehicle 9700. When the power storage device 9701 itself can be more compact and more lightweight as a result of improved characteristics of the power storage device 9701, the vehicle can be lightweight and fuel efficiency can be increased.

This embodiment can be implemented in appropriate combination with any of the structures described in the other embodiments.

EXAMPLE 1

In this example, a description is given of the calculation result of the interaction between an alicyclic quaternary ammonium cation and an electron donating substituent in an ionic liquid included in the nonaqueous electrolyte of one embodiment of the present invention.

In this example, the lowest unoccupied molecular orbitals (LUMO levels) of nine kinds of alicyclic quaternary ammonium cations represented by Structural Formulae ($\alpha$-1) to ($\alpha$-9) were determined by the quantum chemical calculation. The nine kinds of alicyclic quaternary ammonium cations each include a methyl group as any of the substituents $R_1$ to $R_5$ in General Formula (G1). The results are shown in Table 1. In addition, as a comparative example, the lowest unoccupied molecular orbital (LUMO level) of an (N-methyl-N-propylpiperidinium) cation (see Structural Formula ($\alpha$-10)) that is a cation of an ionic liquid having a reduction potential substantially equivalent to an oxidation-reduction potential of lithium is also shown in Table 1.

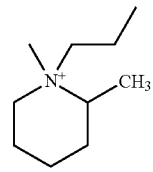

($\alpha$-1)

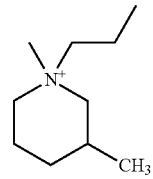

($\alpha$-2)

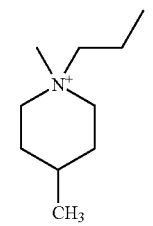

($\alpha$-3)

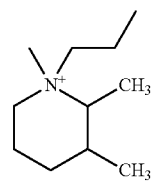

($\alpha$-4)

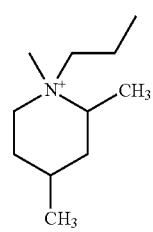

($\alpha$-5)

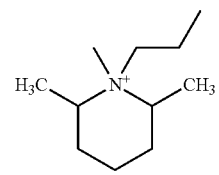

($\alpha$-6)

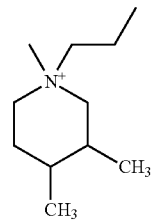

($\alpha$-7)

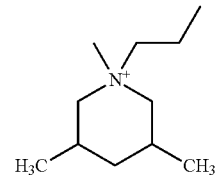

($\alpha$-8)

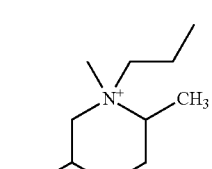

(α-9)

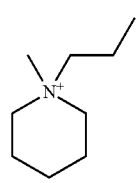

(α-10)

TABLE 1

| | LUMO Level |
|---|---|
| Structural Formula (α-1) | −3.047 [eV] |
| Structural Formula (α-2) | −3.174 [eV] |
| Structural Formula (α-3) | −3.192 [eV] |
| Structural Formula (α-4) | −2.941 [eV] |
| Structural Formula (α-5) | −3.013 [eV] |
| Structural Formula (α-6) | −2.877 [eV] |
| Structural Formula (α-7) | −3.125 [eV] |
| Structural Formula (α-8) | −3.102 [eV] |
| Structural Formula (α-9) | −2.970 [eV] |
| Structural Formula (α-10) | −3.244 [eV] |

In the quantum chemical calculation of this embodiment, the optimal molecular structures in the ground state and a triplet state of the alicyclic quaternary ammonium cations represented by Structural Formulae (α-1) to (α-9) and the (N-methyl-N-propylpiperidinium) cation were calculated by using the density functional theory (DFT). In the DFT, the total energy is represented as the sum of potential energy, electrostatic energy between electrons, electronic kinetic energy, and exchange-correlation energy including all the complicated interactions between electrons. Also in the DFT, an exchange-correlation interaction is approximated by a functional (function of another function) of one electron potential represented in terms of electron density to enable highly accurate calculations. Here, B3LYP which was a hybrid functional was used to specify the weight of each parameter related to exchange-correlation energy. In addition, as a basis function, 6-311 (a basis function of a triple-split valence basis set using three contraction functions for each valence orbital) was applied to all the atoms. By the above basis function, for example, orbits of 1s to 3s are considered in the case of hydrogen atoms while orbits of 1s to 4s and 2p to 4p are considered in the case of carbon atoms. Furthermore, to improve calculation accuracy, the p function and the d function as polarization basis sets were added respectively to hydrogen atoms and atoms other than hydrogen atoms.

Note that Gaussian 09 was used as a quantum chemical calculation program. A high performance computer (manufactured by SGI Japan, Ltd., Altix 4700) was used for the calculations. The quantum chemical calculation was performed assuming that all of the alicyclic quaternary ammonium cations represented by Structural Formulae (α-1) to (α-10) had the most stable structure and were in a vacuum.

The reduction resistance of the cation can be measured relative to the reduction resistance of lithium by comparing the LUMO level of the cation with the LUMO level of the (N-methyl-N-propylpiperidinium) cation having the reduction potential substantially equivalent to the oxidation-reduction potential of lithium. That is, an ionic liquid including any of the alicyclic quaternary ammonium cations represented by Structural Formulae (α-1) to (α-9) each having the LUMO level higher than that of the (N-methyl-N-propylpiperidinium) cation has higher reduction resistance than lithium.

As shown in Table 1, the LUMO level of the (N-methyl-N-propylpiperidinium) cation that is the comparative example represented by Structural Formula (α-10) is −3.244 eV. The LUMO levels of the alicyclic quaternary ammonium cations represented by Structural Formulae (α-1) to (α-9) are all higher than −3.244 eV.

Consequently, it was confirmed that the ionic liquid including any of the alicyclic quaternary ammonium cations represented by Structural Formulae (α-1) to (α-9) had higher reduction resistance than lithium that is a typical low-potential negative electrode material. This is because an inductive effect caused by introducing the electron donating substituent into the alicyclic quaternary ammonium cation eased electric polarization of the alicyclic quaternary ammonium cation, so that the alicyclic quaternary ammonium cation was less likely to accept electrons.

Thus, the reduction potential of the ionic liquid including the alicyclic quaternary ammonium cation can be lowered by introducing the electron donating substituent into the alicyclic quaternary ammonium cation. Therefore, with the use of the ionic liquid with a low reduction potential as the nonaqueous electrolyte of one embodiment of the present invention, a power storage device with favorable cycle characteristics and high reliability can be manufactured.

Note that this example can be implemented in appropriate combination with any of the structures described in the other embodiments and examples.

EXAMPLE 2

In this example, flammability of a nonaqueous solvent of one embodiment of the present invention for a nonaqueous electrolyte will be described. Specifically, a nonaqueous solvent in which 1,3-dimethyl-1-propylpiperidinium bis(fluorosulfonyl)amide (abbreviation: 3mPP13-FSA) that is an ionic liquid represented by Structural Formula (α-11) was mixed with ethylene carbonate or propylene carbonate was checked whether the nonaqueous solvent caught fire.

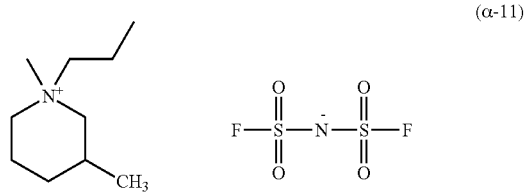

(α-11)

First, a synthesis example of 3mPP13-FSA is described.

To formic acid (15.6 g, 300 mmol) was gradually added 3-methylpiperidine (1.98 g, 200 mmol) while cooling with water. Then, formaldehyde (22.5 ml, 300 mmol) was added to this solution. The mixed solution was heated to 100° C. and cooled back to room temperature after bubble generation, and was stirred for about 30 minutes. After that, the solution was heated and refluxed for one hour.

The formic acid was neutralized with sodium carbonate, the solution was extracted with hexane and dried over magnesium sulfate, and the solvent was distilled off to give 1,3-dimethylpiperidine (12.82 g, 113 mmol) which was a light yellow liquid.

Bromopropane (20.85 g, 170 mmol) was added to methylene chloride (10 ml) to which the light yellow liquid was added, and the mixture was heated and refluxed for 24 hours to give a white precipitate. After filtration, the remaining substance was recrystallized from ethanol and ethyl acetate and dried at 80° C. under reduced pressure for 24 hours to give 1,3-dimethyl-1-propylpiperidinium bromide (19.42 g, 82 mmol) which was a white solid.

Next, 1,3-dimethyl-1-propylpiperidinium bromide (17.02 g, 72 mmol) and potassium bis(fluorosulfonyl)imide (17.04 g, 78 mmol) were mixed and stirred in pure water to immediately give an ionic liquid which is insoluble in water. The ionic liquid was extracted with methylene chloride, washed with pure water 6 times, and dried at 60° C. in vacuum through a trap at −80° C. to give an ionic liquid, i.e., 1,3-dimethyl-1-propylpiperidinium bis(fluorosulfonyl) imide (20.62 g, 61 mmol).

A nuclear magnetic resonance (NMR) spectroscopy and a mass spectrometry (MS) identified the compound synthesized through the above steps as 1,3-dimethyl-1-propylpiperidinium bis(fluorosulfonyl)imide which was a target substance.

$^1$H NMR data of the obtained compound is as follows:
$^1$H-NMR (CDCl$_3$, 400 MHz, 298 K): δ (ppm) 1.02-1.09 (m, 6H), 1.21-1.26, 1.69-1.75 (m, 2H), 1.83-1.91 (m, 2H), 1.94-1.97 (m, 2H), 1.97-2.15 (m, 1H), 2.77-2.87, 3.30-3.43 (m, 2H), 3.05, 3.10 (s, 3H), 3.15-3.54 (m, 2H), 3.25-3.29 (m, 2H).

Figure 8A:
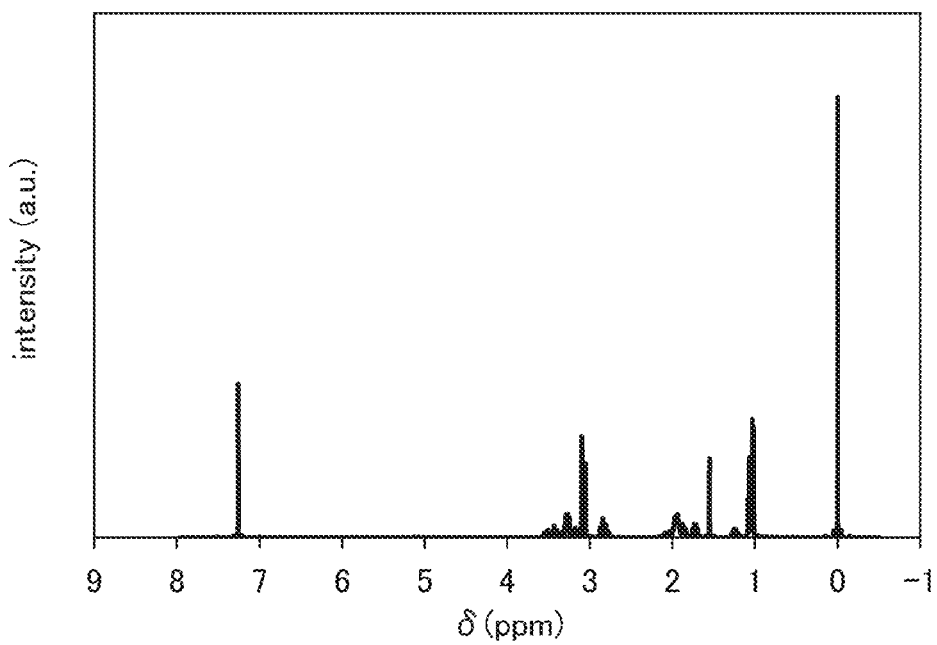
FIGS. 8A and 8B are $^1$H NMR charts of an ionic liquid of one embodiment of the present invention.
Figure 8B:
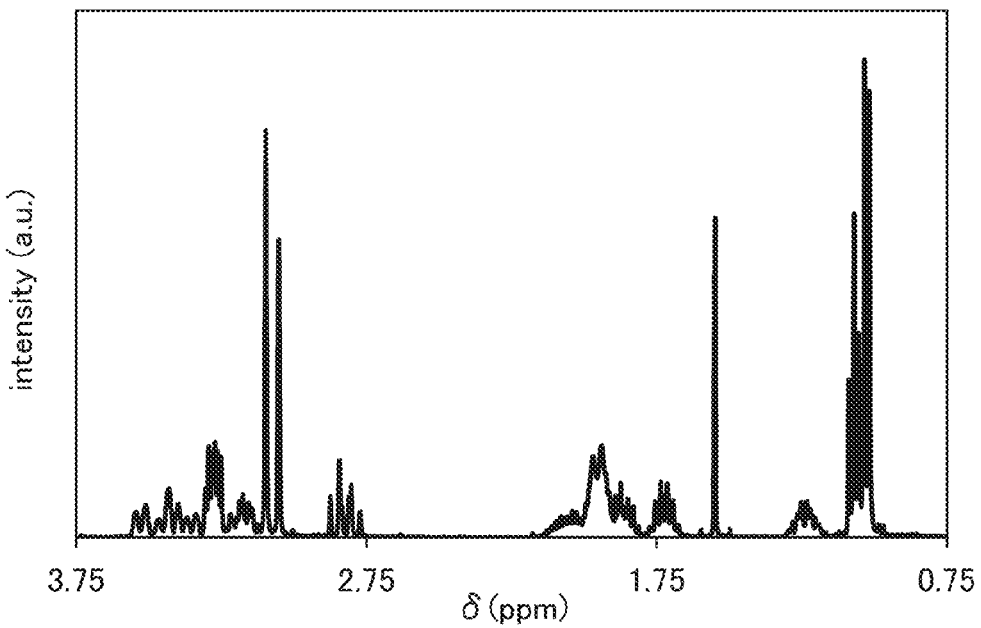

FIGS. 8A and 8B are $^1$H NMR charts. Note that FIG. 8B is a chart where the range of from 0.750 ppm to 3.75 ppm in FIG. 8A is enlarged.

Measurement results of the electro spray ionization mass spectrometry (ESI-MS) of the obtained compound are as follows: MS(ESI-MS): m/z=156.2 (M)$^+$; C$_{10}$H$_{22}$N (156.2), 179.98 (M)$^-$; F$_2$NO$_4$S$_2$ (180.13).

Next, 3mPP13-FSA obtained and ethylene carbonate were mixed to manufacture a sample. Note that a nonaqueous solvent in which 3mPP13-FSA and ethylene carbonate were mixed at a weight ratio of 1:1 and a nonaqueous solvent in which 3mPP13-FSA and ethylene carbonate were mixed at a weight ratio of 7:3 are Nonaqueous Solvent 1 and Nonaqueous Solvent 2, respectively. In addition, a nonaqueous solvent in which 3mPP13-FSA and propylene carbonate were mixed at a weight ratio of 1:1 and a nonaqueous solvent in which 3mPP13-FSA and propylene carbonate were mixed at a weight ratio of 7:3 are Nonaqueous Solvent 3 and Nonaqueous Solvent 4, respectively.

Glass fiber filter papers were soaked in Nonaqueous Solvents 1 to 4 to form Samples 1 to 4, respectively.

In addition, for a comparative example, a glass fiber filter paper was soaked in a nonaqueous electrolyte which includes 1 mol/L of lithium hexafluorophosphate and a nonaqueous solvent in which ethylene carbonate and dimethyl carbonate were mixed at a volume ratio of 1:1 to form Sample 5.

Next, fire was brought close to each of Samples 1 to 5, and 3 seconds later, Samples 1 to 5 were checked whether they caught fire. In the case where the sample did not catch fire for 3 seconds, the sample was exposed to fire for another 2 seconds to be checked whether it caught fire. In the case where the sample did not catch fire for 5 seconds after the fire was first brought close to the sample, the sample was exposed to fire for another 5 seconds to be checked whether it caught fire. In other words, the samples were checked whether they caught fire 3 seconds, 5 seconds, and 10 seconds after the fire was first brought close to the samples.

Table 2 shows the results. In Table 2, a cross indicates that the sample caught fire; a circle indicates that the sample did not catch fire.

|  | 3 seconds later | 5 seconds later | 10 seconds later |
| --- | --- | --- | --- |
| Sample 1 | o | x | — |
| Sample 2 | o | o | o |
| Sample 3 | o | x | — |
| Sample 4 | o | o | o |
| Sample 5 | x | — | — |

Table 2 shows that Sample 5 including only ethylene carbonate and dimethyl carbonate caught fire shortly after the fire was brought close to the sample, that Sample 1 and Sample 3 did not catch fire for 3 seconds but caught fire 5 seconds after the fire was first brought close to the samples, and that Sample 2 and Sample 4 did not catch fire for 10 seconds after the fire was first brought close to the samples.

The above results confirm that the solvent of one embodiment of the present invention for the nonaqueous electrolyte can function as a non-flammable nonaqueous solvent when the ionic liquid content is greater than or equal to 70 wt % per unit weight of the solvent. Thus, the use of the nonaqueous solvent of one embodiment of the present invention enables a power storage device with a high level of safety to be manufactured.

EXAMPLE 3

In this example, examination of intercalation and deintercalation of carrier ions included in the nonaqueous electrolyte of one embodiment of the present invention will be described. Specifically, for the examination of the intercalation and deintercalation of the carrier ions into and from graphite, a graphite-lithium half cell in which graphite was used for one electrode and lithium foil was used for the other electrode was manufactured, and the half cell was subjected to a cyclic voltammetry (CV) experiment.

A method for manufacturing the graphite-lithium half cell is described with reference to FIG. 9.

The half cell manufactured includes a housing 171 and a housing 172 which function as external terminals, a positive electrode 148, a negative electrode 149, a ring-shaped insulator 173, a separator 156, a spacer 181, and a washer 183. The positive electrode 148 functions as a working electrode of the graphite-lithium half cell, and the negative electrode 149 functions as a counter electrode of the graphite-lithium half cell.

In the positive electrode 148, a positive electrode active material layer 143 containing a positive electrode active material, a conductive additive, and a binder at a weight ratio of 85:15:7.5 is provided over a positive electrode current collector 142 made of aluminum foil (16.156φ)). Note that graphite (TSG-Al, produced by JFE Chemical Corporation) was used as the positive electrode active material.

Lithium foil (15φ)) was used for the negative electrode 149. For the separator 156, GF/C which is a glass fiber filter paper produced by Whatman Ltd. was used.

The positive electrode 148 was soaked in a nonaqueous electrolyte of one embodiment of the present invention for one hour. Note that in the nonaqueous electrolyte, lithium bis(trifluoromethanesulfonyl)amide (LiTFSA) was dissolved in the nonaqueous solvent in which 3mPP13-FSA manufactured by the method described in Example 2 was mixed with ethylene carbonate.

The housing 171 and the housing 172 were formed of stainless steel (SUS). The spacer 181 and the washer 183 were also formed of stainless steel (SUS).

Figure 9:
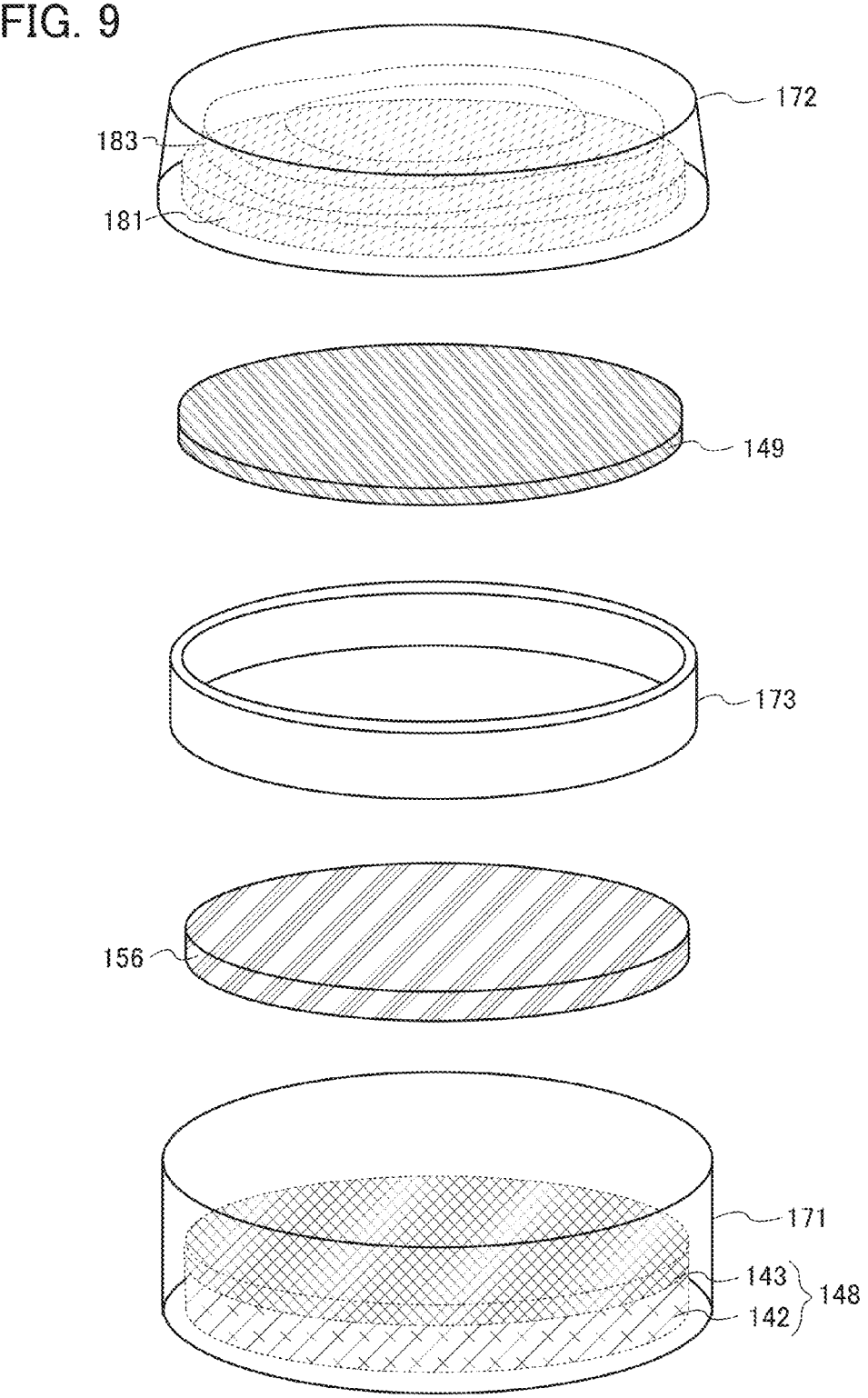
FIG. 9 illustrates a manufacturing method of a power storage device of one embodiment of the present invention.

As illustrated in FIG. 9, the housing 171, the positive electrode 148, the separator 156, the ring-shaped insulator 173, the negative electrode 149, the spacer 181, the washer 183, and the housing 172 were stacked in this order from the bottom side. The positive electrode 148, the negative electrode 149 and the separator 156 were soaked in the nonaqueous electrolyte. Then, the housing 171 and the housing 172 were crimped to each other with a "coin cell crimper." Thus, the graphite-lithium half cell was manufactured.

A half cell including a nonaqueous solvent in which 3mPP13-FSA and ethylene carbonate were mixed at a weight ratio of 1:1 was manufactured as Half Cell 1. Half cells including nonaqueous solvents in which 3mPP13-FSA and ethylene carbonate were mixed at weight ratios of 8:2 and 7:3 were manufactured as Half Cells 2 and 3, respectively in a manner similar to that of Half Cell 1. In addition, for a comparative example, a half cell including a single solvent, i.e., 3mPP13-FSA was manufactured as Half Cell 4.

Figure 10A:
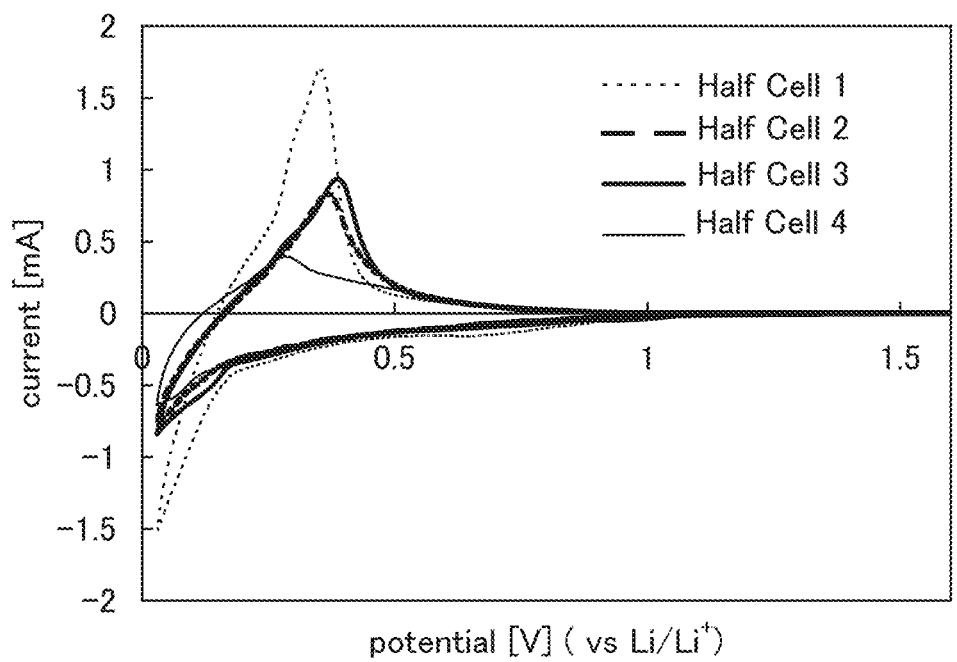
FIGS. 10A and 10B each show current versus voltage characteristics of an ionic liquid of one embodiment of the present invention.

Next, Half Cells 1 to 4 were subjected to the CV experiment. In the CV experiment, the sweep potential was 0 V to 1.5 V and the sweep rate was 0.1 mV/s. In the CV experiment, lithium metal was used for a reference electrode, the potential was swept for three cycles. FIG. 10A shows current versus potential curves at the first cycle.

In FIG. 10A, the horizontal axis represents potential of the working electrode (vs. $Li/Li^+$), and the vertical axis represents current generated by reduction-oxidation. Note that as for the current values measured by the CV experiment, negative current values indicate reduction current, and positive current values indicate oxidation current. The reduction current flow means that intercalation of lithium ions which are carrier ions occurs, and the oxidation current flow means that deintercalation of the lithium ions occurs.

FIG. 10A confirms that intercalation and deintercalation of lithium ions occurred in every half cell. FIG. 10A also confirms that the absolute values of oxidation current and reduction current increase as the 3mPP13-FSA content decreases and the ethylene carbonate content increases. Further, it can be said that when the absolute values of the oxidation current and the reduction current are larger, intercalation and deintercalation of lithium ions occur more easily. In other words, intercalation and deintercalation of lithium ions occur more easily as the 3mPP13-FSA content is lower and the ethylene carbonate content is higher. However, the degree of non-flammability decreases as described in Example 2 when the ethylene carbonate content is too high as in Half Cell 1; thus, the 3mPP13-FSA content is preferably higher than the ethylene carbonate content.

Figure 10B:
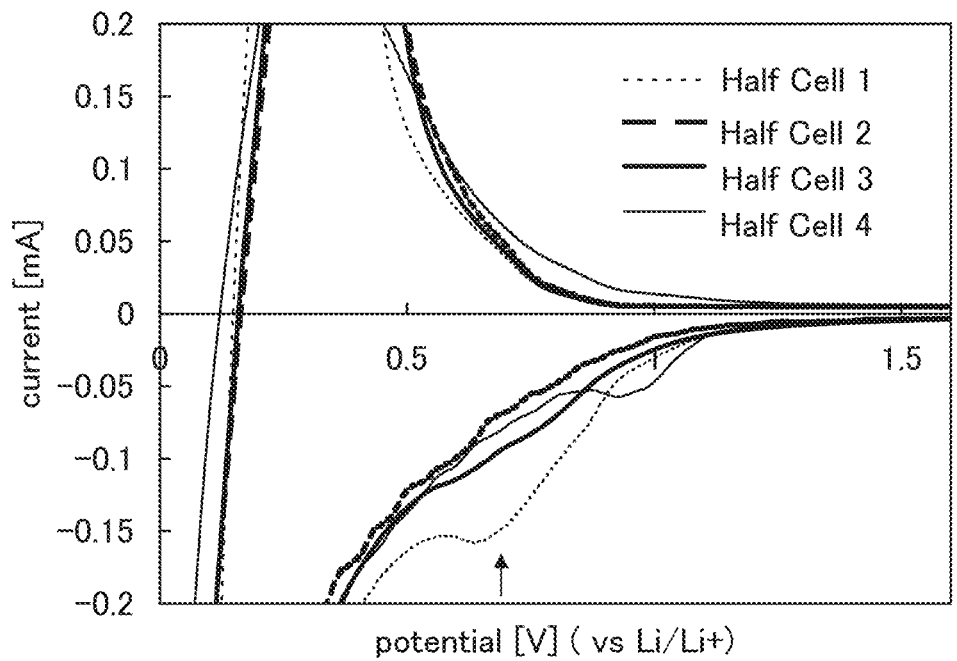

FIG. 10B is a graph where the range of from −0.2 V to 0.2 V of the vertical axis in FIG. 10A is enlarged. According to FIG. 10B, the peak current of Half Cell 1 was observed at around 0.7 V of the horizontal axis. As shown by Half Cells 2, 3, and 4, the reduction current peak observed at around 0.7 V of the horizontal axis, which is indicated by an arrow in FIG. 10B, decreases as the 3mPP13-FSA content increases.

As described above, when the ionic liquid content in the solvent for the nonaqueous electrolyte of one embodiment of the present invention is greater than or equal to 70 wt % per unit weight of the solvent, the solvent can have non-flammability and intercalation and deintercalation of lithium ions can easily occur. Thus, the use of the nonaqueous solvent of one embodiment of the present invention enables a power storage device which has a high level of safety and good charging and discharging rate characteristics to be manufactured.

EXAMPLE 4

In this example, charging and discharging characteristics of a power storage device of one embodiment of the present invention will be described. Specifically, a coin-type lithium secondary battery was manufactured using a nonaqueous electrolyte of one embodiment of the present invention, and the charging and discharging characteristics of the coin-type lithium secondary battery were evaluated. Note that as the coin-type lithium secondary battery in this example, a lithium iron phosphate-graphite full cell, in which lithium iron phosphate was used for one electrode and graphite was used for the other electrode, was manufactured.

A method for manufacturing the lithium iron phosphate-graphite full cell is described with reference to FIG. 11.

The full cell manufactured includes the housing 171 and the housing 172 which function as external terminals, the positive electrode 148, the negative electrode 149, the ring-shaped insulator 173, the separator 156, the spacer 181, and the washer 183.

In the positive electrode 148, the positive electrode active material layer 143 containing a positive electrode active material, a conductive additive, and a binder at a weight ratio of 85:8:7 is provided over the positive electrode current collector 142 made of aluminum foil (15.958φ)). Note that lithium iron phosphate (22.21 mg to 25.02 mg) was used as the positive electrode active material.

In the negative electrode 149, a negative electrode active material layer 146 containing a negative electrode active material, a conductive additive, and a binder at a weight ratio of 85:15:7.5 is provided over a negative electrode current collector 145 made of aluminum foil (16.156φ)). Note that graphite (TSG-Al, produced by JFE Chemical Corporation, 10.69 mg) was used as the negative electrode active material.

For the separator 156, GF/C which is a glass fiber filter paper produced by Whatman Ltd. was used.

The positive electrode 148 was soaked in the nonaqueous electrolyte of one embodiment of the present invention for one hour. Note that in the nonaqueous electrolyte, lithium bis(trifluoromethanesulfonyl)imide (LiTFSA) was dissolved at a concentration of 1.0 mol/L in the nonaqueous solvent in which 3mPP13-FSA manufactured by the method described in Example 2 was mixed with ethylene carbonate.

The housing 171 and the housing 172 were formed of stainless steel (SUS). The spacer 181 and the washer 183 were also formed of stainless steel (SUS).

Figure 11:
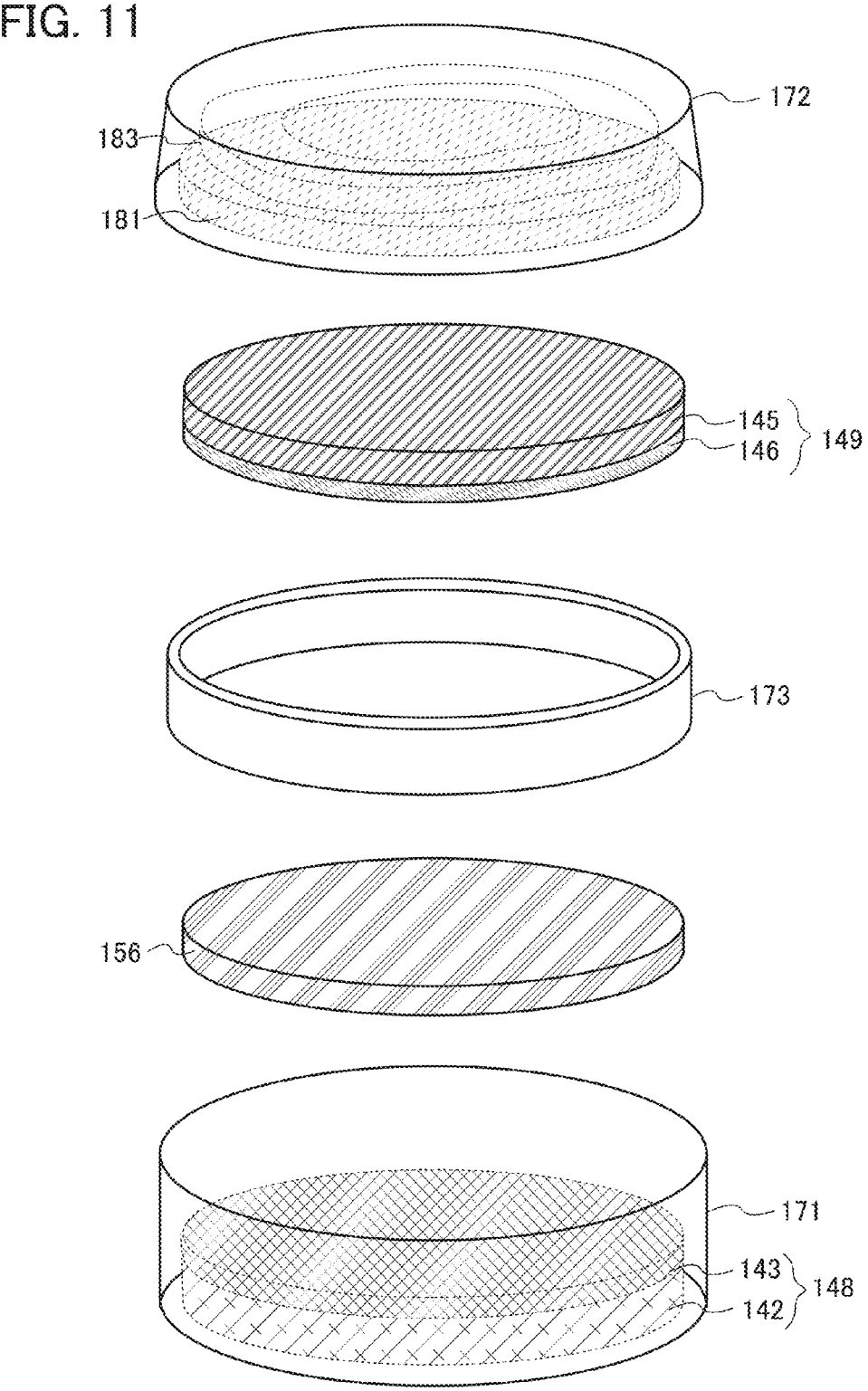
FIG. 11 illustrates a manufacturing method of a power storage device of one embodiment of the present invention.

As illustrated in FIG. 11, the housing 171, the positive electrode 148, the separator 156, the ring-shaped insulator 173, the negative electrode 149, the spacer 181, the washer 183, and the housing 172 were stacked in this order from the bottom side. The positive electrode 148, the negative electrode 149 and the separator 156 were soaked in the nonaqueous electrolyte. Then, the housing 171 and the housing 172 were crimped to each other with a "coin cell crimper." Thus, the lithium iron phosphate-graphite full cell was manufactured.

A full cell including a nonaqueous solvent in which 3mPP13-FSA and ethylene carbonate were mixed at a weight ratio of 8:2 was manufactured as Full Cell 1. In addition, for a comparative example, a full cell including a single solvent, i.e., ethylene carbonate was manufactured as Full Cell 2.

Next, charging and discharging characteristics of Full Cells 1 and 2 were measured. The charging and discharging characteristics were measured at room temperature with a charge/discharge tester (produced by TOYO SYSTEM Co., LTD). In the measurement, constant-current constant-voltage charging was employed; constant-current charging was performed at a rate of 0.2 C, and then low-voltage charging was performed at 4.3 V. Note that the charging was terminated when a value of current flowing during the constant-voltage charging period became lower than a current value corresponding to a rate of 0.01 C.

Figure 12A:
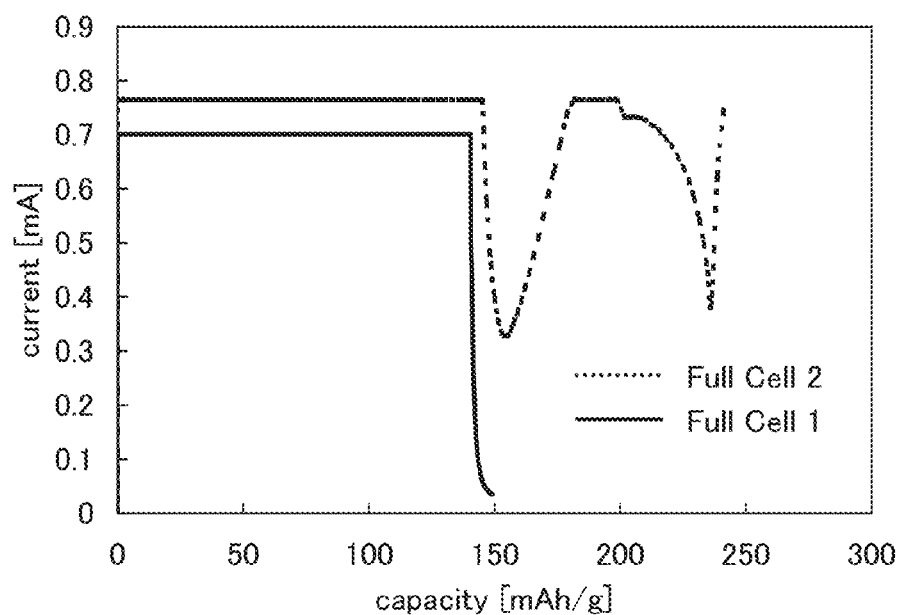
FIGS. 12A and 12B each show charging and discharging characteristics of a power storage device of one embodiment of the present invention.

FIG. 12A shows the charging characteristics of Full Cell 1 (solid line) and Full Cell 2 (dotted line). The horizontal axis represents capacity [mAh/g] per weight of the positive electrode active material, and the vertical axis represents values of current flowing through Full Cells 1 and 2 at the time of charging. Note that different current values during the constant-current charging period are attributed to different weights of the positive electrode active materials. However, since the weight of the positive electrode active material has a very small effect on the behavior of the charging characteristics, it can be said that the difference between Full Cell 1 and Full Cell 2 lies in the different nonaqueous solvents in the nonaqueous electrolytes.

FIG. 12A confirms that in Full Cell 1 using, as the solvent for the nonaqueous electrolyte, the nonaqueous solvent in which 3mPP13-FSA and ethylene carbonate were mixed, the value of the current rapidly decreased and became lower than the current value corresponding to a rate of 0.01 C when the period was switched from the constant-current charging period to the constant-voltage charging period, so that the charging of Full Cell 1 was terminated. In contrast, in Full Cell 2 using a single solvent, i.e., ethylene carbonate as the solvent for the nonaqueous electrolyte, the value of the current continued to vary after the period was switched from the constant-current charging period to the constant-voltage charging period, and did not become lower than the current value corresponding to a rate of 0.01 C, so that the charging of Full Cell 2 was not terminated. In other words, the above results indicate that current kept flowing through Full Cell 2 even during the constant-voltage charging period and decomposition of the nonaqueous electrolyte (particularly the nonaqueous solvent) as well as the charging reaction occurred in Full Cell 2.

Figure 12B:
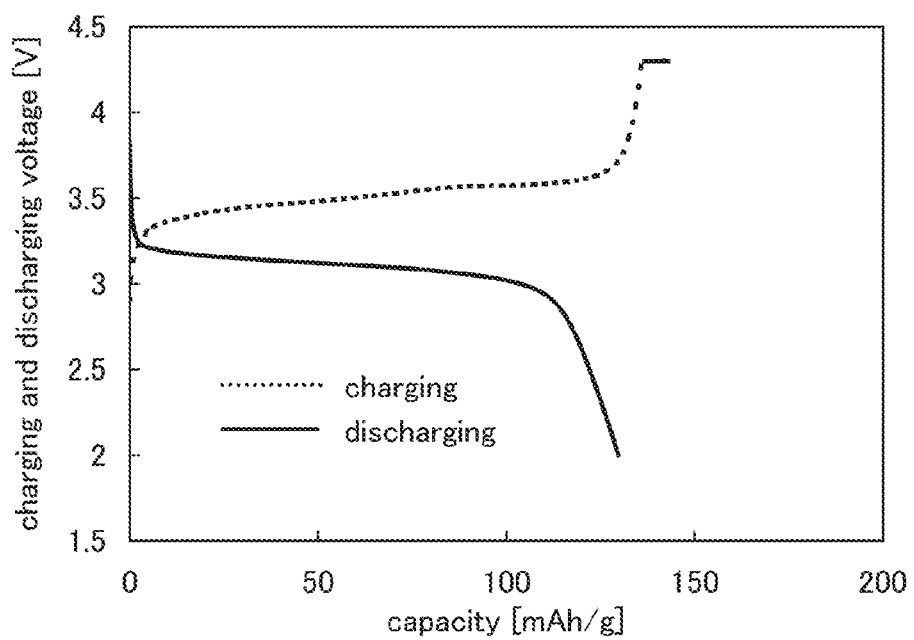

FIG. 12B shows the charging and discharging characteristics of Full Cell 1. The horizontal axis represents capacity [mAh/g] per weight of the positive electrode active material, and the vertical axis represents charging and discharging voltage [V]. FIG. 12B confirms that Full Cell 1 using, as the solvent for the nonaqueous electrolyte, the nonaqueous solvent in which 3mPP13-FSA and ethylene carbonate were mixed has good charging and discharging characteristics.

As described above, the use of the nonaqueous solvent in which 3mPP13-FSA and ethylene carbonate are mixed as the solvent for the nonaqueous electrolyte makes it possible to prevent the constant-voltage charging period from being extended and to manufacture a power storage device which has low irreversible capacity and good charging and discharging characteristics.

This application is based on Japanese Patent Application serial no. 2011-282485 filed with the Japan Patent Office on Dec. 23, 2011, the entire contents of which are hereby incorporated by reference.

What is claimed is:

1. A liquid comprising:
a cyclic ester; and
an ionic liquid represented by General Formula (G1),

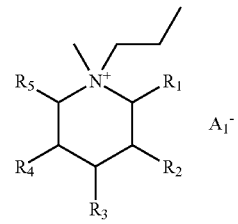

(G1)

wherein one of $R_1$ to $R_5$ represents a methyl group; and
wherein the other of $R_1$ to $R_5$ each represent a hydrogen atom;
and
$A_1^-$ represents any of a monovalent imide-based anion, a monovalent methide-based anion, a perfluoroalkyl sulfonic acid anion, tetrafluoroborate, and hexafluorophosphate.

2. The liquid according to claim 1, wherein the liquid is a nonaqueous solvent.

3. The liquid according to claim 1, wherein a content of the ionic liquid is greater than or equal to 70 wt % and less than 100 wt % per unit weight of the ionic liquid and the cyclic ester.

4. The liquid according to claim 1, wherein the cyclic ester is ethylene carbonate or propylene carbonate.

5. A power storage device comprising:
a positive electrode;
a negative electrode; and
an electrolyte comprising:
 a cyclic ester;
 an alkali metal salt; and
 an ionic liquid represented by General Formula (G1),

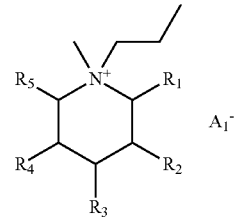

(G1)

wherein one of $R_1$ to $R_5$ represents a methyl group; and
wherein the other of $R_1$ to $R_5$ each represent a hydrogen atom;
and
$A_1^-$ represents any of a monovalent imide-based anion, a monovalent methide-based anion, a perfluoroalkyl sulfonic acid anion, tetrafluoroborate, and hexafluorophosphate.

6. The power storage device according to claim 5, wherein a content of the ionic liquid is greater than or equal to 70 wt % and less than 100 wt % per unit weight of the ionic liquid and the cyclic ester in the electrolyte.

7. The power storage device according to claim 5, wherein a content of the ionic liquid is greater than or equal to 50 wt % and less than 80 wt % per unit weight of the electrolyte.

8. The power storage device according to claim 5, wherein the cyclic ester is ethylene carbonate or propylene carbonate.

9. The power storage device according to claim 5, wherein the alkali metal salt in the electrolyte is a lithium salt.

10. The liquid according to claim 1,
wherein $A_1^-$ represents any of $(C_nF_{2n+1}SO_2)_2N^-$, $CF_2(CF_2SO_2)_2N^-$ and $(C_mF_{2m+1}SO_3)^-$,
wherein n is 0 to 3, and
wherein m is 0 to 4.

11. The liquid according to claim 1,
wherein $R_2$ represents a methyl group, and
wherein $R_1$ and $R_3$ to $R_5$ each represent hydrogen.

12. An electrolyte comprising:
the liquid according to claim 1; and
an alkali metal salt.

13. The electrolyte according to claim 12, wherein the alkali metal salt in the electrolyte is a lithium salt.

14. The electrolyte according to claim 12, wherein a content of the ionic liquid is greater than or equal to 50 wt % and less than 80 wt % per unit weight of the ionic liquid, the cyclic ester and the alkali metal salt.

15. A liquid comprising:
a cyclic ester; and
an ionic liquid represented by General Formula (G4)

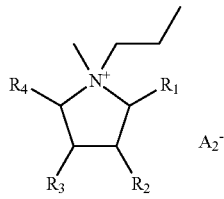

(G4)

wherein:
one of $R_1$ to $R_4$ represents a methyl group;
the other of $R_1$ to $R_4$ each represent a hydrogen atom;
$R_5$ and $R_6$ represent different alkyl groups having 1 to 4 carbon atoms; and $A_1^-$ represents any of a monovalent imide-based anion, a monovalent methide-based anion, a perfluoroalkyl sulfonic acid anion, tetrafluoroborate, and hexafluorophosphate.

16. The liquid according to claim 15, wherein a content of the ionic liquid is greater than or equal to 70 wt % and less than 100 wt % per unit weight of the ionic liquid and the cyclic ester.

17. The liquid according to claim 15, wherein the cyclic ester is ethylene carbonate.

18. The liquid according to claim 15,
wherein $A_1^-$ represents any of $(C_nF_{2n+1}SO_2)_2N^-$, $CF_2(CF_2SO_2)_2N^-$ and $(C_mF_{2m+1}SO_3)^-$,
wherein n is 0 to 3, and
wherein m is 0 to 4.

19. An electrolyte comprising:
the liquid according to claim 15; and
an alkali metal salt.

20. The electrolyte according to claim 19, wherein the alkali metal salt in the electrolyte is a lithium salt.

21. The electrolyte according to claim 19, wherein a content of the ionic liquid is greater than or equal to 50 wt % and less than 80 wt % per unit weight of the ionic liquid, the cyclic ester and the alkali metal salt.

22. A power storage device comprising:
a positive electrode;
a negative electrode; and
an electrolyte comprising:
the liquid according to claim 15; and
an alkali metal salt.

23. The power storage device according to claim 5,
wherein $A_1^-$ represents any of $(C_nF_{2n+1}SO_2)_2N^-$, $CF_2(CF_2SO_2)_2N^-$ and $(C_mF_{2m+1}SO_3)^-$,
wherein n is 0 to 3, and
wherein m is 0 to 4.

24. The power storage device according to claim 5,
wherein $R_2$ represents a methyl group,
wherein $R_1$ and $R_3$ to $R_5$ each represent hydrogen,
wherein $R_6$ represents a methyl group, and
wherein $R_7$ represents a propyl group.

* * * * *